(12) United States Patent
Wagner

(10) Patent No.: US 7,493,573 B2
(45) Date of Patent: Feb. 17, 2009

(54) SCROLLING VERTICAL COLUMN MECHANISM FOR CELLULAR TELEPHONE

(75) Inventor: Annette M. Wagner, Los Altos, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 804 days.

(21) Appl. No.: 10/600,185

(22) Filed: Jun. 20, 2003

(65) Prior Publication Data

US 2004/0155908 A1 Aug. 12, 2004

Related U.S. Application Data

(60) Provisional application No. 60/460,052, filed on Apr. 2, 2003, provisional application No. 60/460,041, filed on Apr. 2, 2003, provisional application No. 60/445,763, filed on Feb. 7, 2003.

(51) Int. Cl.
*G06F 3/00* (2006.01)
(52) U.S. Cl. .................. 715/864; 715/861; 715/810; 715/802; 715/788; 715/763
(58) Field of Classification Search ................. 715/864, 715/861, 810, 802, 788, 763
See application file for complete search history.

(56) References Cited

U.S. PATENT DOCUMENTS

| 5,657,049 | A | | 8/1997 | Ludolph et al. |
| 5,896,133 | A | * | 4/1999 | Lynch et al. ................ 715/854 |
| 6,133,898 | A | | 10/2000 | Ludolph et al. |
| 6,668,177 | B2 | * | 12/2003 | Salmimaa et al. ........... 455/566 |
| 6,990,534 | B2 | * | 1/2006 | Mikhailov et al. .......... 709/250 |
| 2002/0035613 | A1 | * | 3/2002 | Hirayama ................... 709/218 |
| 2004/0142720 | A1 | * | 7/2004 | Smethers ................ 455/550.1 |
| 2006/0161865 | A1 | * | 7/2006 | Scott et al. .................. 715/810 |

OTHER PUBLICATIONS

David Hemphill, David G. Morehouse II, "MIDP 2.0 Is Ready for the Enterprise", *Java Pro*, Mar. 2003.
David Hemphill, David G. Morehouse II, "MIDP 2.0 Is Ready for the Enterprise", http://www.fawcette.com/javapro/2003_03/magazine/features/dhemphill/default_pf.asp.

* cited by examiner

*Primary Examiner*—Weilun Lo
*Assistant Examiner*—Mylinh Tran
(74) *Attorney, Agent, or Firm*—Martine Penilla & Gencarella, LLP

(57) ABSTRACT

A system and method of navigating a mobile device display includes highlighting a first icon in a main portion of the mobile device display. The main portion is traversed to a tertiary tray. The tertiary tray includes a second icon. The second icon is highlighted. A single navigation key is used to traverse the main portion and to highlight the second icon.

16 Claims, 21 Drawing Sheets

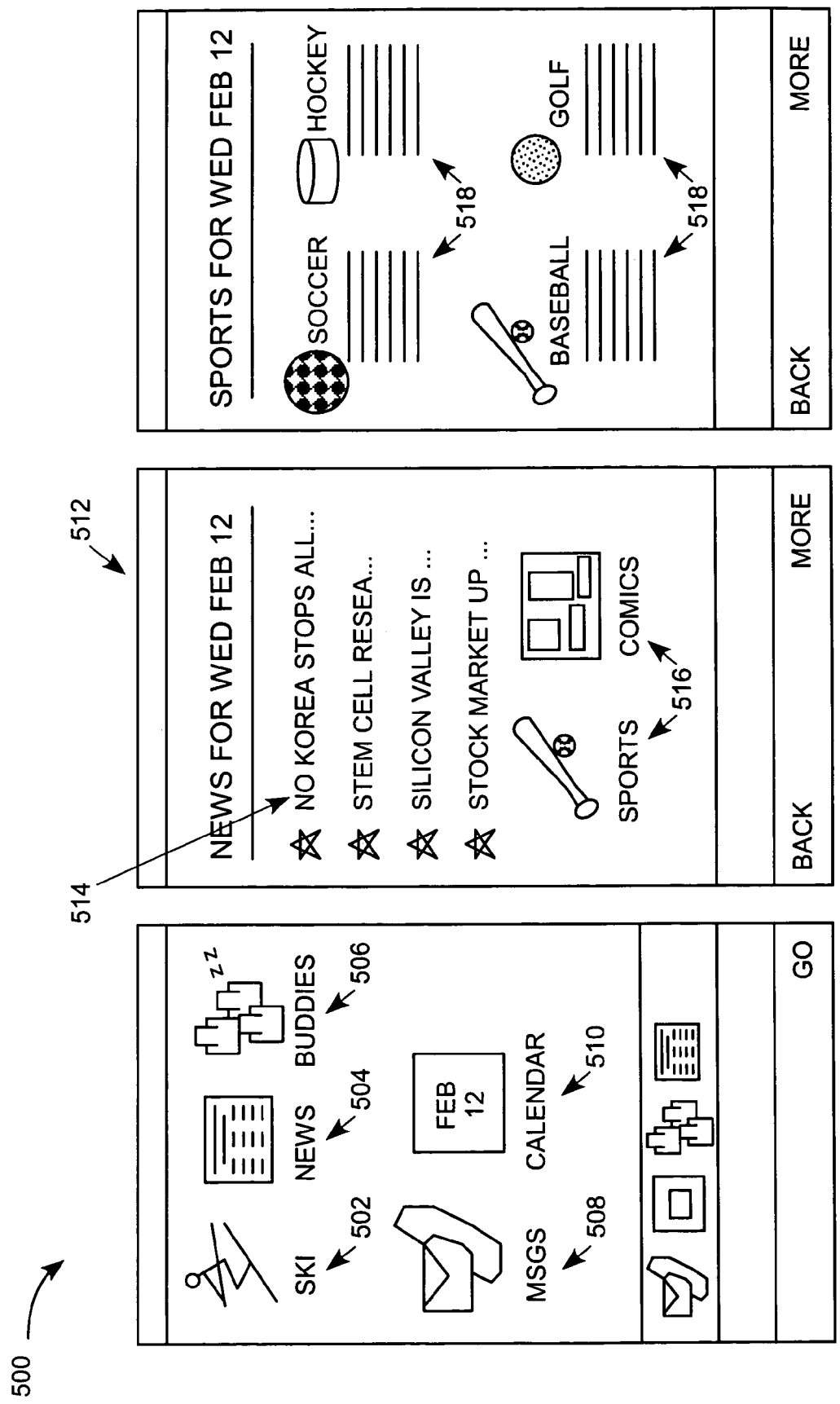

SCROLLING VERTICAL COLUMN MECHANISM FOR CELLULAR TELEPHONE

CROSS REFERENCE TO RELATED APPLICATIONS

This application claims priority from U.S. Provisional Patent Application No. 60/460,052 filed on Apr. 2, 2003 and entitled "Context Based Main Screen for Mobile Device," and U.S. Provisional Patent Application No. 60/460,041 filed on Apr. 2, 2003 and entitled "System and Method for Advanced Service Interaction," and U.S. Provisional Patent Application No. 60/445,763, filed on Feb. 7, 2003 and entitled "Modularization of Wireless Device Code Components and Custom Design Integration of Java and Non-Java Code Components" by Lee et al., which are incorporated herein by reference in their entirety.

BACKGROUND OF THE INVENTION

1. Field of the Invention

This invention relates generally to mobile devices, and more particularly to software and systems for user interfaces on mobile devices.

2. Description of the Related Art

Although, cellular telephone systems have traditionally been utilized to provide voice data communication, additional data services, such as Internet access and scheduling, are being made increasingly available to mobile device subscribers. For example, FIG. 1 is a block diagram of an exemplary cellular telephone system 100. The cellular telephone system 100 includes a mobile device 102, such as a cellular phone, which is in communication with a carrier network 104. The carrier network 104 supplies the network and other elements to enable the mobile device 102 to interact with the internal services 106 and external services 108 available via the carrier system 104.

For example, the carrier network 104 typically can include a number of fixed base station transceivers, which mobile devices 102 communicate with via radio channels. However, the number of radio channels that the operator is permitted to use is limited, and there generally is not enough for each mobile device 102 in the network to be carried on a different channel. Thus, the carrier network 104 reuses channels, that is, at any time many base stations may be receiving and transmitting on each channel. The coverage area of each radio base station is often referred to as a "cell."

As mentioned above, in addition to voice services, data services are being made increasingly available to mobile device subscribers. Thus, in addition to voice data services, such as voice mail, telephone call back, and three-way calling, carrier networks 104 are beginning to provide additional electronic data to users in various ways. Exemplary data services can include calendaring facilities, book buying services, Internet browsing, and text messaging. As mobile devices 102 become more sophisticated, the mobile devices 102 can execute software applications, which can be front ends for data services.

As illustrated in FIG. 1, the carrier network 104 may provide internal services 106, which are data services provided directly from the carrier network 104. For example, internal services can include calendaring facilities, instant messaging, and other services that the carrier network 104 provider is capable of providing to subscribers. To provide additional data services, the carrier network 104 can partner with third party providers of external services 108. Each external service 108 actually runs the service, and the carrier network 104 facilitates usage of the service to its subscribers by provisioning the service throughout the carrier network 104. In this manner, subscribers can interact with the external services 108 using their mobile devices 102, such as their cellular telephones.

Often Carrier Networks 104 are proficient at providing particular classes of data services, such as scheduling and instant messaging. For other services, the carrier network 104 relies on the external service providers 108. These external service providers 108 generally provide services to the carrier network 104, which can charge subscribers more for the services. The carrier network provider 104 is then charged, in turn, by the external service providers 108. These external services then appear as part of the carrier network services to the subscriber.

Unfortunately, full utilization of data services has not occurred, most notably because of the difficulty many users experience in using data services on a mobile device and a lack of data service management capabilities of carrier networks. For example, many high-end cellular phones include an Internet browser. However, the startup time for the browser often is long. In addition, from the point of view of the user, the user is required to do a very technical operation in starting up the browser, going to a bookmark or remembering a URL, and typing all the required information into the phone. If the user is lucky, a text messaging service may be available through their carrier network. However, to use such a service, the user generally is required to close down the browser, navigate the various menus to find the messaging icon, and select the icon to begin the text messaging service. In addition, multiple external services often are difficult for a carrier network service. That is, carrier networks often experience difficulties in managing the various service relationships between services provided by the external service providers. So aggregating the services that user will ultimately see on their mobile device is difficult for carrier networks to manage.

Thus, a major inhibitor to data service utilization is the lack of a seamless, intuitive, easy user experience with data service usage on the mobile device. That is, a user is required to have a relatively in depth technical knowledge of the phone and carrier capabilities to utilize the data services. For example, to utilize an external book purchasing service, the user is required to know that they must startup the Internet browser, select the appropriate URL, and navigate to the appropriate purchase section of the related web site.

In view of the foregoing, there is a need for techniques that provide an improved user interface with and access to data services on mobile devices. The improved user interface should be intuitive and user friendly.

SUMMARY OF THE INVENTION

Broadly speaking, the present invention fills these needs by providing an improved user interface for a mobile computing device. It should be appreciated that the present invention can be implemented in numerous ways, including as a process, an apparatus, a system, computer readable media, or a device. Several inventive embodiments of the present invention are described below.

On embodiment includes a method of navigating a mobile device display that includes highlighting a first icon in a main portion of the mobile device display. The main portion is traversed to a tertiary tray. The tertiary tray includes a second icon. The second icon is highlighted. A single navigation key is used to traverse the main portion and to highlight the second icon.

The tertiary tray can be adjacent to a vertical edge of the mobile device display. The tertiary tray includes at least one scroll button and wherein selecting the scroll button causes a third icon to be displayed in the tertiary tray.

Selecting the scroll button can include shifting the second icon. Shifting the second icon can include not displaying the second icon in the tertiary tray.

Traversing the main portion to the tertiary tray can include traversing the main portion to a tertiary tab and opening the tertiary tray by highlighting the tertiary tab.

Opening a tertiary tray can include covering at least part of the main portion of the mobile device display. Covering at least part of the main portion of the mobile device display can includes covering at least part of the first icon.

Opening a tertiary tray can include rearranging at least part of the main portion of the mobile device display. Opening a tertiary tray can include scaling at least part of the main portion of the mobile device display. Opening the tertiary tray can include shifting at least part of the main portion of the mobile device display.

The method can also include selecting the second icon. Selecting the second icon can initiate a corresponding application or service. Selecting the second icon can also close the tertiary tray. Selecting the second icon can also cause the second icon to be displayed in the main portion of the mobile device display.

Displaying the second icon in the main portion of the mobile device display can include removing the first icon from the main portion of the mobile device display. Displaying the second icon in the main portion of the mobile device display can include moving the first icon in the main portion of the mobile device display.

Another embodiment includes a mobile device display. The mobile device display can include a main portion that includes a first icon. The first icon represents at least one of a service or an application. The mobile device display can also include a vertical tertiary tray that includes a second icon. A single navigation key is used to traverse the main portion to the second icon in the tertiary tray.

The mobile device display can also include a tertiary tab linked to the tertiary tray. The tertiary tray is not displayed until the tertiary tab is highlighted. The mobile device display is included in a mobile device.

Another embodiment includes a method of navigating a mobile device display. The method includes highlighting a first icon in a main portion of the mobile device display, traversing the main portion to a vertical tertiary tray including a second icon, and highlighting the second icon. A single navigation key is used to traverse the main portion and to highlight the second icon, the method further includes selecting the second icon. Selecting the second icon initiates at least one of a corresponding application and a corresponding service.

Traversing the main portion to the tertiary tray can include traversing the main portion to a tertiary tab and opening the tertiary tray by highlighting the tertiary tab. The open tertiary tray covers at least part of the main portion of the mobile device display.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 5A illustrates an exemplary home page mobile device display for services managed via service management system, in accordance with an embodiment of the present invention.

FIG. 5B illustrates an exemplary news data service display, in accordance with an embodiment of the present invention.

FIG. 5C illustrates an exemplary sports section of a news data service, in accordance with an embodiment of the present invention.

DETAILED DESCRIPTION OF THE EXEMPLARY EMBODIMENTS

Several exemplary embodiments for an improved user interface and display will now be described. Embodiments of the present invention integrate systems and software to manage and integrate for example, multiple data services and applications for a context-based display on a mobile device. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

One embodiment of the present invention includes a context-based main display screen such as may be used on a mobile device or other device. Another embodiment divides the main display screen into a main portion and a second portion. The second portion can be animated so as to open when a user selects the second portion. The main portion of the screen can include user-selected icons that represent data services and applications. The second portion can also include icons. The second portion can also include a scrolling capability so that the second portion can include more icons than can be displayed at one time. While the following description of the present invention is described in terms of cellular telephone systems, it should be understood that embodiments of the present invention are not limited to cellular telephone systems or cellular telephone handsets. By way of example the present invention can be deployed on a personal digital assistant (PDA) connected to a computer network (e.g., the Internet, Ethernet, etc.). The network connection can be via any of the various wired and wireless protocols (e.g., Ethernet, IEEE 802.11, Bluetooth, etc.).

Figure 1:
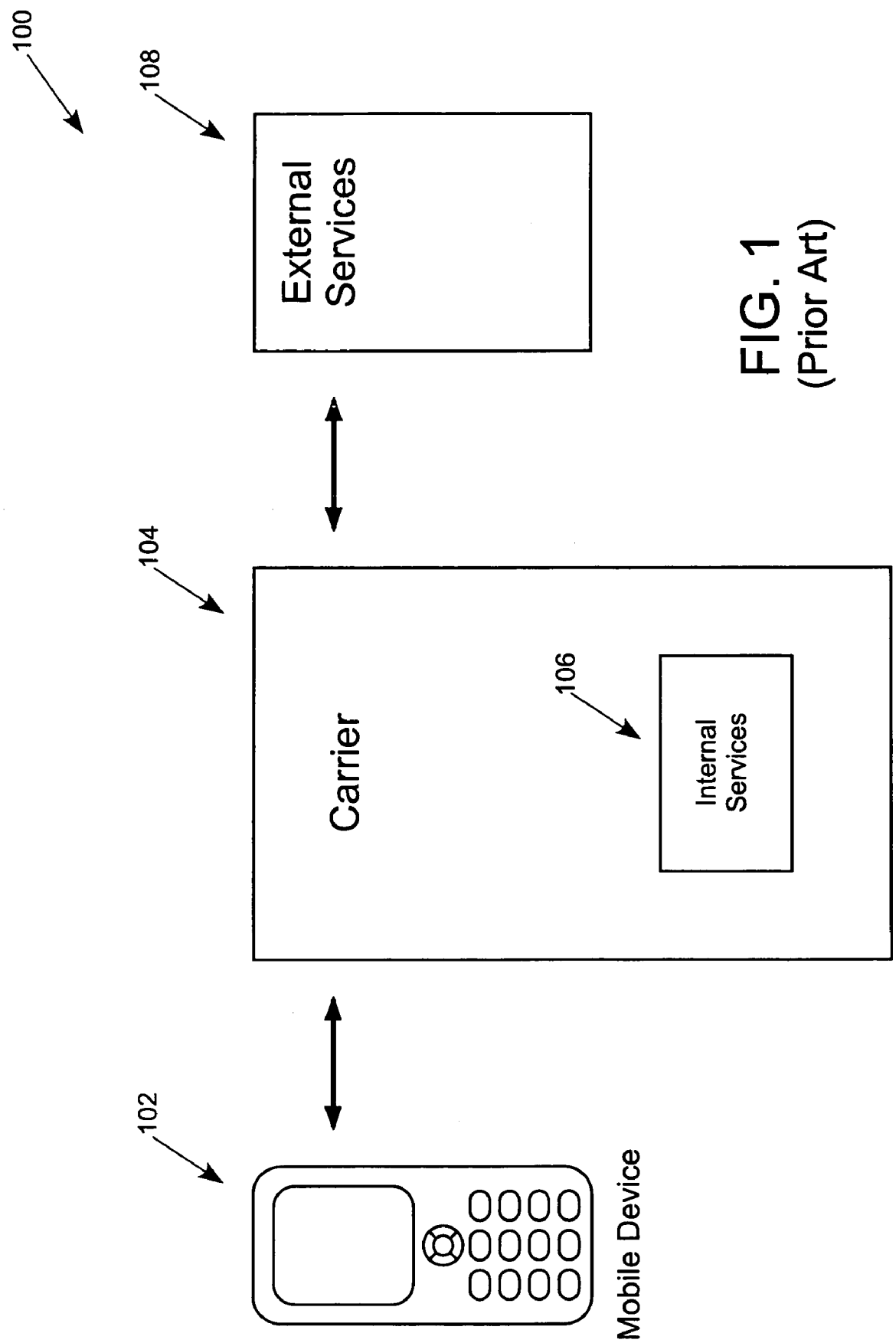
FIG. 1 is a block diagram of an exemplary cellular telephone system.
Figure 2:
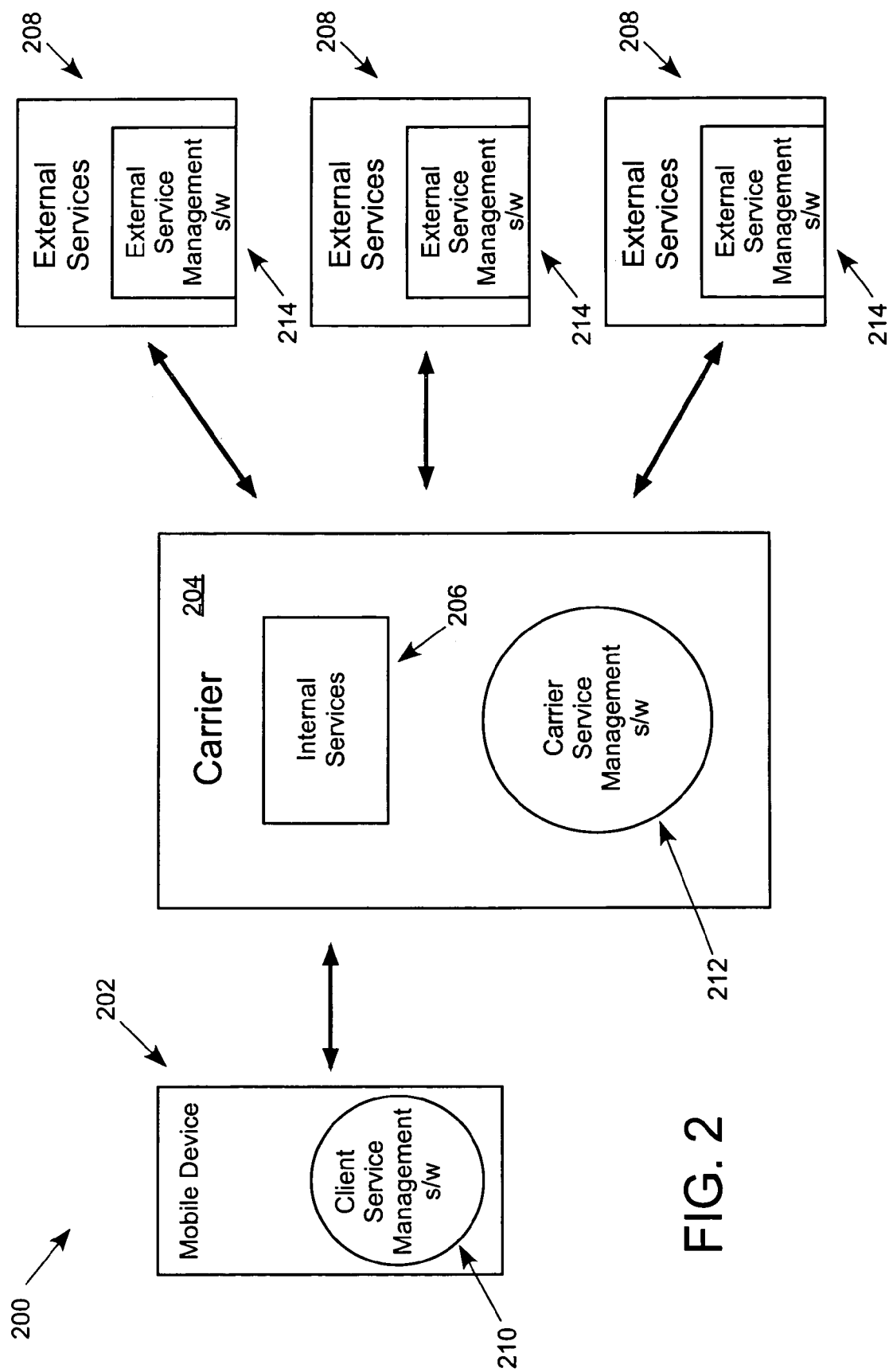
FIG. 2 is a block diagram showing a cellular telephone system having advanced service interaction, in accordance with an embodiment of the present invention.

FIG. 2 is a block diagram showing a cellular telephone system 200 having advanced service interaction, in accordance with an embodiment of the present invention. The cellular telephone system 200 includes a mobile device 202, such as a cellular phone, which is in communication with a carrier network provider 204. The carrier network provider 204 supplies the network and other elements to enable the mobile device 202 to interact with the internal services 206 and external services 208 available via the carrier network provider 204.

For example, as described above, the carrier network provider 204 typically can include a number of fixed base station transceivers, with which mobile devices 202 communicate via radio channels. However, the number of radio channels that the operator is permitted to use is limited, and there generally is not enough for each mobile device 202 in the network to be carried on a different channel. Thus, the carrier network 204 reuses channels, that is, at any time many base stations may be transmitting and receiving on each channel. The coverage area of each radio base station is often referred to as a "cell."

Embodiments of the present invention manage and integrate services using service management system spread across the components of the system 200. In one embodiment, the service management system includes client service management software 210 installed on the mobile devices 202 of the system, and carrier service management software 212 located within the carrier network 204. In addition, the service management system can include external service management software 214, which is located at the external service providers 208. Although FIG. 2 illustrates the service management software allocated between the mobile devices 202, carrier network 204, and external services 208, it should be noted that the embodiments of the present invention can be embodied on any one or two elements of the system 200. By way of example, while the cellular telephone system 200 includes internal services 206 and external services 208, it should be understood that the user interface and display, described in more detail below, may also provide access to applications and functions wholly contained within the mobile device 202.

The service management system of one embodiment of the present invention provides a seamless, intuitive, and easy user experience with data services on mobile devices 202. As will be explained in greater detail below, embodiments of the present invention provide data services to users based on user specific information, including user context information. Broadly speaking, the carrier provider 204 stores profile information regarding individual subscribers. In addition, the carrier provider can store information regarding each individual subscriber's service usage patterns, such as, what services the individual uses, when they use each service, and how often each service is utilized. Based on the above user information and stored descriptions of the data services available on the system 202, embodiments of the present invention display data services to subscribers in a manner that the subscriber is most likely to utilize the data services. Furthermore, as will be described in greater detail below, embodiments of the present invention recognize usage patterns and data convergence to further enhance the users experience.

Figure 3:
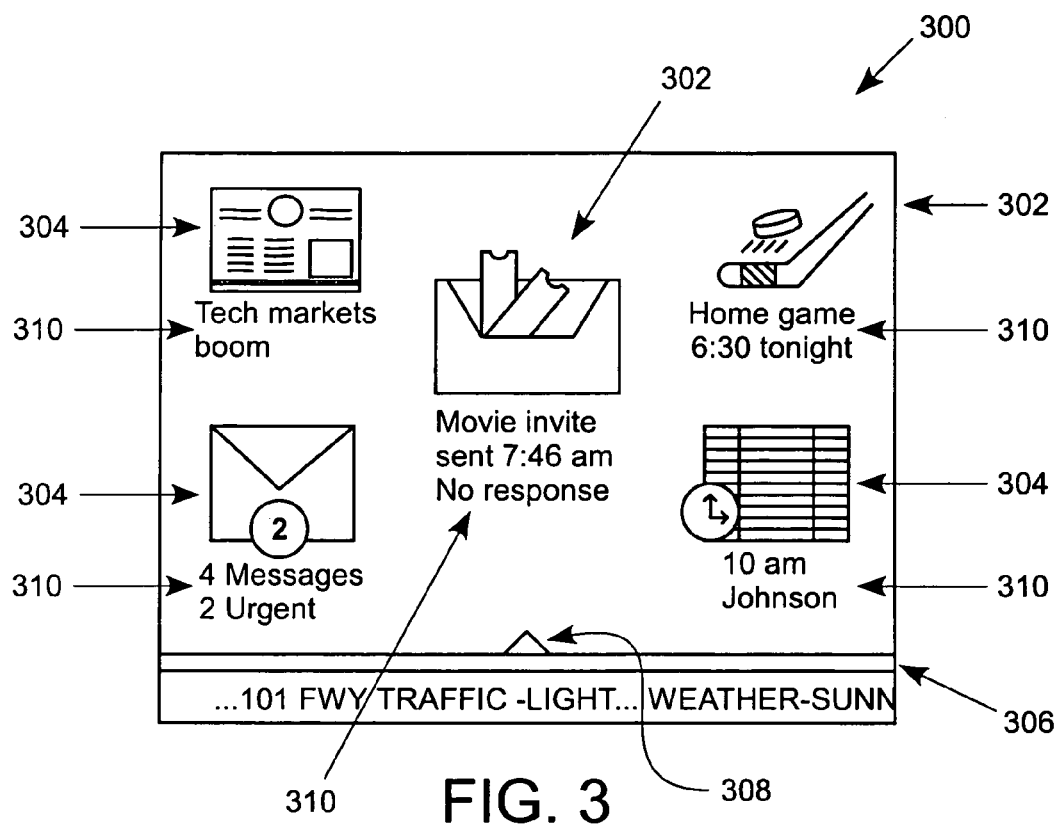
FIG. 3 is an illustration showing an exemplary context based display for a mobile device, in accordance with an embodiment of the present invention.

FIG. 3 is an illustration showing an exemplary context based display 300 for a mobile device, in accordance with an embodiment of the present invention. As discussed above, the context-based display 300 can be applied to any type of mobile device (e.g., cellular telephone, PDA). As will be described in greater detail below, the context-based display 300 can be generated utilizing context aware information in at least on embodiment. Hence, the information displayed on the context-based display 300 may be dependent on, for example, the time of day, location of the user, usage patterns, and preferences.

The context-based display 300 presents services and applications to users utilizing icons. In the example of FIG. 3, the icons are displayed in various locations on the context-based display 300 dependent on predicted usage. In particular, each icon can be presented in a primary position 302, secondary position 304, or tertiary position 306. In the example of FIG. 3, the icons located at the tertiary positions 306 are hidden within a tertiary tray accessed via a tertiary tab 308, however, it should be noted that the tertiary tray is only an example of tertiary icon placement. As such, icons displayed in tertiary positions can be presented in any manner, such as on a side of the display, transparently, or in any other manner that conveys tertiary importance.

The icon located at the primary position 302 represents the service or application that the service management system currently predicts the user is primarily interested in. In one embodiment, the icon located at the primary position 302 generally is displayed using a relatively larger icon than the icons located in the secondary positions 304. In addition, the icon located at the primary position 302 can be centrally located to further convey its importance. It should be noted, however, that the icon at the primary position 302 could be presented to the user in any manner that conveys the predicted primary interest in the service or application.

The icons in the secondary positions 304 represent services and applications that the service management system predicts the user also is currently interested in, although less interested in as the service represented by the icon in the primary position 302. Finally, icons at the tertiary position 306 represent additional or even all of the services and applications available to the user.

In addition to using positional data to assist the user in service and application selection, the service management system also provides informational icon labels 310. Each informational icon label 310 presents specific information regarding the state of that particular service or application as it applies to the user. For example, an icon representing a news service may have an informational icon label displaying a current headline for the user. In the example of FIG. 3, the user has a preference for business news information. As such, the informational icon label 310 for the news service displays the business headline "Tech Markets Boom." Further, the text comprising each informational icon label 310 can be automatically updated as the state of that particular service changes as it applies to the particular user.

To further assist the user in service and application selection, embodiments of the present invention animate particular icons to indicate additional information regarding the particular service or application that the icon represents. Thus, the animated icons are informational in nature. For example, an icon representing the news icon may initially be displayed as a "rolled up" newspaper. Then, to indicate new news has arrived, the news icon may animate to display an "unrolled" newspaper. As another example, a mail icon may display a counter that changes to indicate the number of unread messages a user has. As mentioned above, additional icons are displayed in a tertiary position accessed via the tertiary tab 308, as described next with reference to FIG. 4.

Figure 4:
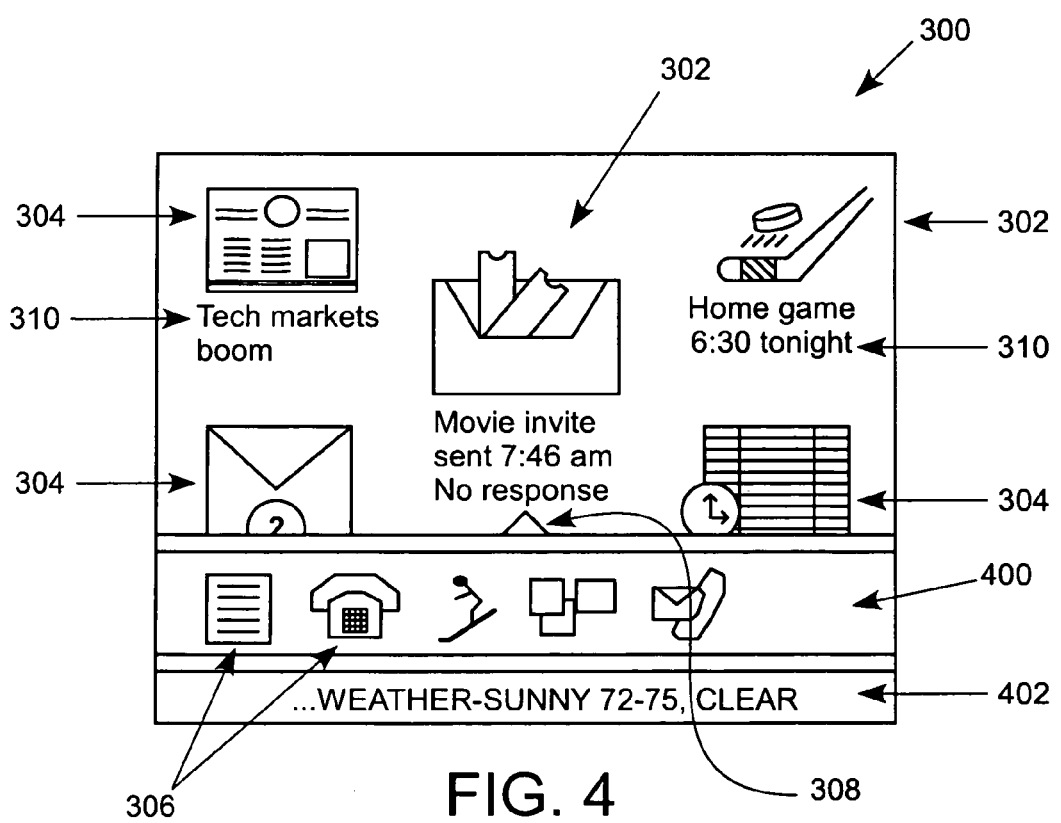
FIG. 4 is an illustration showing an exemplary context based display having tertiary icons exhibited, in accordance with an embodiment of the present invention.

FIG. 4 is an illustration showing an exemplary context based display 300 having tertiary icons exhibited, in accordance with an embodiment of the present invention. When the user selects the tertiary tab 308, a tertiary icon tray 400 is displayed revealing icons in the tertiary positions 306. As mentioned above, icons at the tertiary position 306 can represent additional services and applications available to the user that are not already displayed in the primary 302 or secondary 304 positions. These are services and applications that the service management system predicts will not be utilized as soon or as often as the services and applications represented by the icons in the primary and secondary positions 302 and 304. Alternatively, the icons at the tertiary position 306 can represent a complete set of all of the services and applications available to the user.

In addition to the icons, embodiments of the present invention can display additional information as scrolling text in a ticker tape display 402. The ticker tape display 402 can present additional useful information, such as a weather report and stock quotes, based on the users current context. Similar to above, the information displayed in the ticker tape display 402 changes based on changes in the users current context. For example, a particular user may have the day's weather displayed in ticker tape display 402 in the morning, while current headlines may be displayed in the ticker tape display 402 in the afternoon.

As mentioned above, embodiments of the present invention provide data services, applications and data service and application usage analysis to users based on user specific information. Broadly speaking, in one embodiment, the carrier provider can store profile information regarding individual users. In addition the carrier provider can store information regarding each individual user's service and application usage patterns, such as, what services and applications the individual uses, when they use each service and application, and how often each service and application is utilized.

Figure 5E:
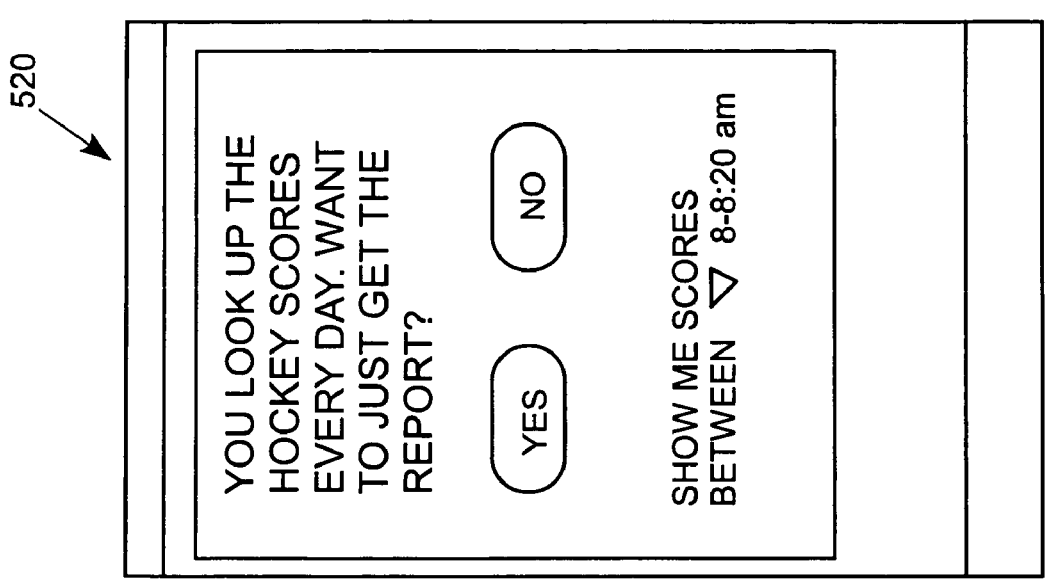
FIG. 5E illustrates an exemplary query display for a hockey data service, in accordance with an embodiment of the present invention.

FIGS. 5A-5F illustrate usage pattern recognition for an exemplary subscriber who, for example, has viewed hockey reports at 7:30 a.m. for the last two days. FIG. 5A illustrates an exemplary home page mobile device display 500 for services managed via service management system, in accordance with an embodiment of the present invention. In the example of FIG. 5A, five data services are displayed based on the usage patterns of the particular subscriber owning the mobile device. For example in FIG. 5A, the mobile device displays a ski service 502, a news service 504, a buddies service 506, a messaging service 508, and a calendaring service 510. As described in greater detail below, embodiments of the present invention store user profile information for individual subscribers. The data services 502-510 displayed in FIG. 5A are based on the user profile information of the subscriber owning the particular mobile device.

In the example of FIG. 5A the user decides to view the news by selecting the news data service 504. In response, the mobile device displays a news data screen illustrated in FIG. 5B. FIG. 5B illustrates an exemplary news data service display, in accordance with an embodiment of the present invention. The news service data displayed shows, for example, a date display 512, current headlines 514, and several news sections 516. Continuing with the above example, the user selects the sports section 516. In response, the mobile device displays the sports section of the news data service as illustrated in FIG. 5C.

Figure 5D:
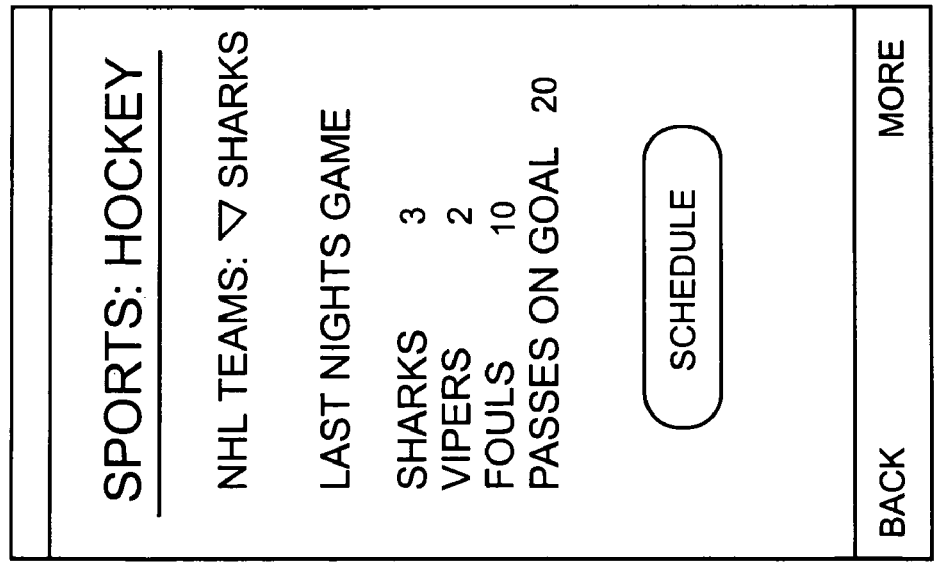
FIG. 5D illustrates exemplary game scores for an exemplary user's favorite hockey team, in accordance with an embodiment of the present invention.

FIG. 5C illustrates an exemplary sports section of a news data service in accordance with an embodiment of the present invention. For example, FIG. 5C illustrates a plurality of sports reports 518. Each sports report 518 provides information on a particular sport, such as, soccer, hockey, baseball, and golf. Continuing with the above example the user selects the hockey report 518 to obtain, for example, the recent hockey scores of their favorite team. As illustrated in FIG. 5D the game score for the user's favorite team is displayed for the user.

Figure 5F:
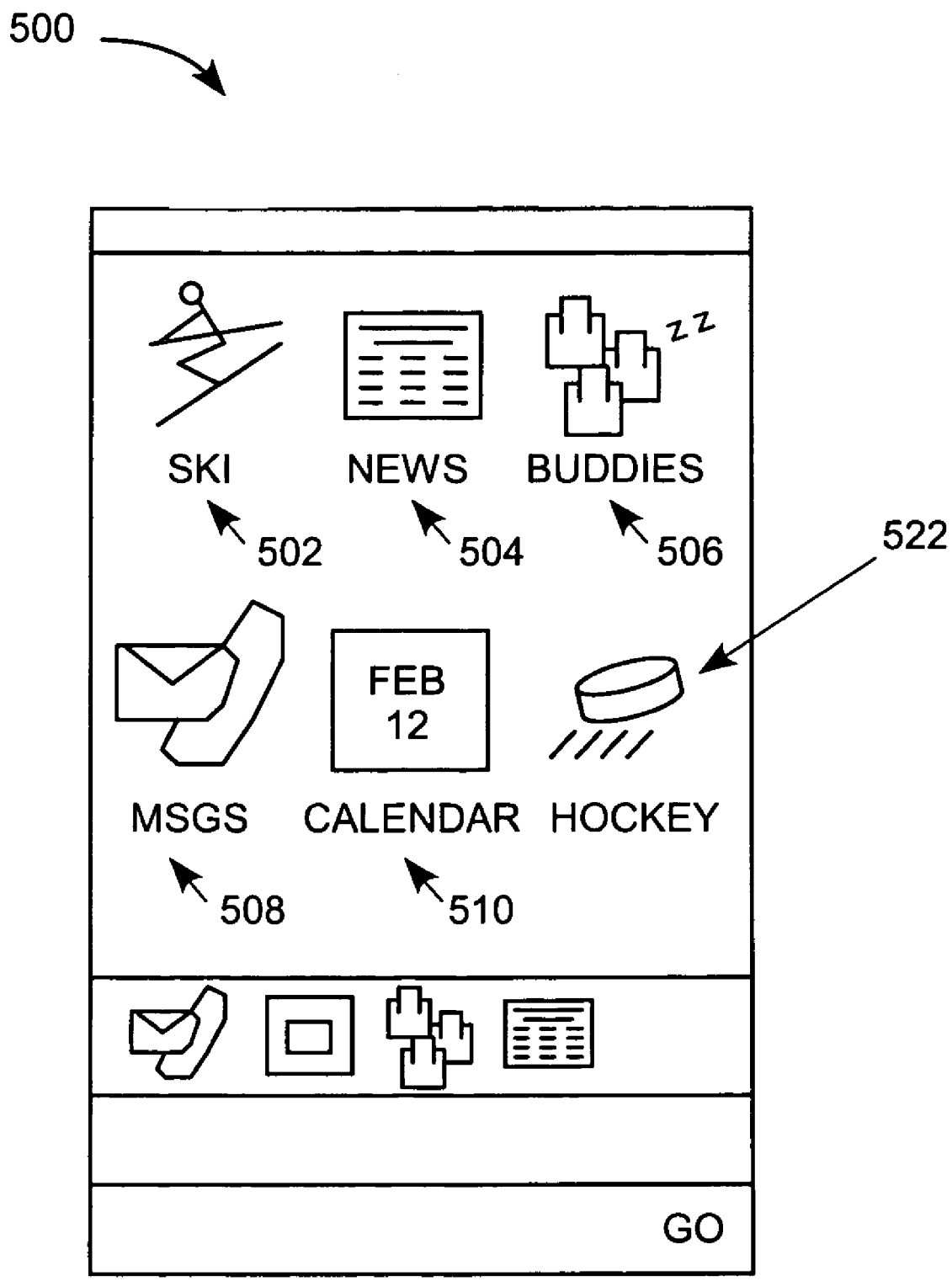
FIG. 5F illustrates an exemplary hockey icon added to a user's home page, in accordance with an embodiment of the present invention.

At this point the service management system of the embodiments of the present invention detects that this particular subscriber has viewed the hockey sports report 518 at about the same time three days in a row. The service management system detects this as a usage pattern that suggests a particular service. In response, the service management system displays a query display 520 as illustrated in FIG. 5E. FIG. 5E illustrates an exemplary query display 520 for a hockey data service in accordance with an embodiment of the present invention. The query display 520 queries the user as to whether the user would like to see the hockey report everyday at 7:30 a.m. Preferably, the query display 520 is displayed as if it were part of the hockey screen. That is, the query display 520 preferably appears to the user as a natural extension of what they were already doing, in this case, viewing the hockey report. Continuing with the above example the user confirms that they would like to view the hockey reports 518 on a daily basis. In response a hockey icon 522 is added to the user's home page mobile device display 500, as illustrated in FIG. 5F.

Figure 6:
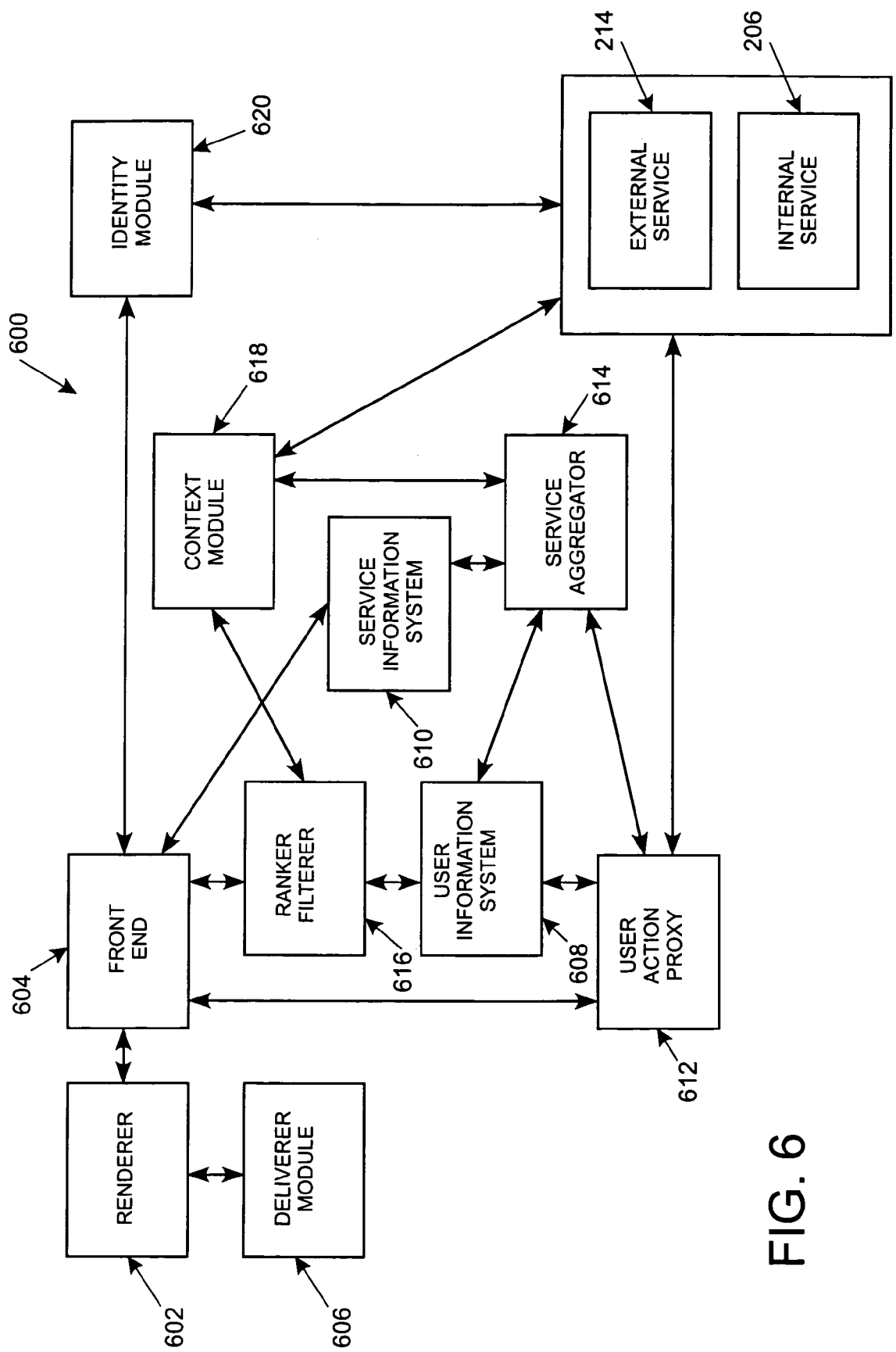
FIG. 6 is a block diagram showing exemplary functional blocks comprising service management system, in accordance with an embodiment of the present invention.

FIG. 6 is a block diagram showing exemplary functional blocks comprising service management system 600, in accordance with an embodiment of the present invention. As described above, the service management system 600 can be spread across the components of a carrier network system. In one embodiment, the service management system includes client service management software installed on the mobile devices of the system, carrier service management software located within the carrier network, and external service management software located at the external service providers. However, as mentioned previously, the service management system 600 can be embodied on any one or more elements of the system.

Broadly speaking, the service management system 600 encompasses several functional elements including a renderer 602, front end 604, delivery module 606, user information system 608, service information system 610, user action proxy 612, service aggregator 614, ranker filterer 616, and context module 618. Utilizing these functional elements, the service management system 600 of the embodiments of the present invention provides a seamless, intuitive, and easy user experience with data services on mobile devices.

As shown in FIG. 6, the renderer 602 interprets a service management grammar and uses that information to generate a user interface display, which the user uses to interact with the mobile device. The service management grammar is an information format that encapsulates an abstract representation of any mobile device supporting the user interface semantics of the embodiments of the present invention. In particular, the service management grammar includes the information necessary to render device displays, which can display individual services in a plurality of different ways. For example, the service management grammar allows services and applications to be displayed in summarized form, such as an icon. In one embodiment, the summarized form reflects the active state of the service or application, that is, whether the service or application is quiescent, active, needs attention, or has summarized information to display. In addition, service management grammar allows services to be displayed in detailed form, for example, when the service or application is actively displaying and gathering information to and from the user. It should be noted that information can be displayed in many different detailed forms, such as scrolling, using the entire screen display, or hidden while still running in the background.

The renderer 602 can be embodied as part of the client service management software, the carrier service management software, or both, depending on the needs and desires of the actual system designer. Any information represented on the screen that the user interacts with is rendered using the renderer 602. Also, the renderer 602 translates any information sent from the mobile device to a server in the carrier network into the service management grammar. The renderer 602 is in communication with a front end 604 and a delivery module 606.

The front-end 604 communicates with backend service management software components in order to generate service management grammar on demand. For example, when a mobile device is turned on, the mobile device may display a particular screen of information to the user. In order to display the screen, the mobile device requests the screen from the front end 604. Depending on the context of the request, the front-end 604 queries appropriate service management system components for the data required to create the requested screen. The front-end 604 then responds to the mobile device request with service management grammar for the screen. The renderer 602 then interprets the service management grammar into the screen of information that the user sees on the mobile device.

The renderer 602 also communicates with a delivery module 606 to obtain information needed to generate a display for the user. The delivery module 606 manages the delivery of large portions of binary data, such as large image files, MPEG files, and pieces of executable code. Thus, renderer 602 utilizes both the front-end 604 and the delivery module 606 to obtain information needed to generate a display for the user. For example, to display a movie viewing service, the front end 604 may provide the service management grammar for a movie selection page to the renderer 602, which interprets the service management grammar to generate the movie selection screen. When the user selects a movie to watch, the renderer 602 may contact the delivery module 606 to obtain the actual movie viewing software and movie files.

As mentioned above, the carrier network provider provides internal services 206 and the external service providers provide external services 214. Generally, these services are represented by an icon on the display of the mobile device. However, not all services need to have an icon representation. For example, a telephone call is an example of a service that does not require icon representation. As mentioned above, internal services 206 can include, for example, facilities and applications for calendaring, instant messaging, and other services and applications that the carrier network provider is capable of providing to users. External services 214 can include, for example, sports news, ski reports, movie services, mapping services, and other services from external service providers, which the carrier network provisions throughout the carrier network to facilitate usage of the service to subscribers.

Two information systems are utilized by the embodiments of the present invention, namely, the user information system 608 and the service information system 610. The service information system 610 is an information storage that lists all the services, both internal and external, that are available through the carrier network. The service information software 610 can be embodied in a database, a directory server, a file system, or any other type of system capable of storing and retrieving data on the services available via the carrier network and external service providers. Together with the above described list of services, the service information software 610 stores descriptions of each listed service, which provides information useful to the system for facilitating display and provisioning of the service. For example, a service description can include information on how a particular service should be rendered, such as, should the service be displayed as an icon, a scrolling message, or using the entire screen. In addition, the description of a service describes how the service can be utilized with another service. Further, the description of a service can describe how the service fits with the carrier's business model. For example, a description may indicate a particular service is targeted at 18-25 year old males, or the service should be promoted to current premium members.

Embodiments of the present invention allow services to be aggregated. For example, a movie service that list movie times and location can be aggregated. with a location service that provides GPS location information and driving directions. In this example, the location service can be utilized to determine where the subscriber is currently located, and then list movies times for theaters are a particular distance from the subscriber's current location, for example, within ten miles of the subscriber. To perform service aggregation, the description of the movie service includes information indicating that the movie service can be utilized in combination with location information, and the location service description can include information indicating that the location service can expose location information to other services.

A service description can further include information on how the service operates with carrier network functions. Carrier network providers often want users to subscribe to additional services that are available via the carrier network. Consequently, carrier network providers often want users to be able to easily subscribe to these additional services. Thus, service descriptions can include information regarding when and in what situations the particular service is useful to subscribers. In this manner, the carrier network can inform users about the service when the described situations occur.

The user information system 608 stores profile information regarding individual subscribers, such as, an individuals billing packages, age, credit card number, address, and other user information. In addition, the user information system 408 stores information regarding the individual's service usage patterns, such as, what services the individual uses, when they use each service, and how often each service is utilized. For example, for a particular user, the user information system 608 can store information such as the fact that the user turned on their mobile device at 7:00 a.m. and immediately utilized a news service for 5 minutes.

The service management system 600 also includes a user action proxy 612, which tracks the activities of all the users currently connected to the service management system. For example, when a subscriber utilizes a news service, the user action proxy 612 detects the subscriber's usage of the news service. Hence, the user action proxy 612 knows what each user is doing online at any particular time. It also knows the current state for each service subscribed to by a particular user and how the state of the service or application is changing based upon the user's actions. For example, if a user has two messages in their inbox of their email service, the user action proxy 612 knows the email service is in an active state because the messages have yet to be read. Other examples include calendaring services, where if the user is not using the calendaring service and no appointments are set, the user action proxy 612 knows the service is currently inactive. The user action proxy 612 stores the tracked user activities in the user information system 608.

In addition, the user action proxy 612 can interpret a combination of service activities to mean a particular event. That is, the user action proxy 612 monitors the services of each user and notices particular patterns that may occur within the services. When such patterns are detected, the user action proxy 612 can notify the user that the user should potentially take action regarding the pattern. For example, a user may have a note in their "to-do" list on their calendaring application that says "Call Bob." In addition, the user may have an appointment with Bob at 3:00 p.m. stored in the user's calendar. Then, for example, Bob may call the user and leave a voice mail for the user. In this example, the user action proxy 612 will notice that Bob is a common theme within the services and applications, and as such, may send the user an alert indicating something important may be occurring regarding Bob.

Using the service descriptors or the service information software 610, the service aggregator 614 combines individual services into linked and aggregated services and applications. As mentioned above, the service information software 610 includes service descriptors describing how services can be utilized together. The service aggregator 614 dynamically links these services and applications together based on the service descriptions. Continuing the movie and location service example from above, the movie service will have a service descriptor and the location service will have a service descriptor stored in the service information software 610. The service aggregator 614 examines the service descriptor of the movies service and the service descriptor of the location service and determines that the two services can be utilized together. In addition, the service aggregator 614 can examine the user information system 608 to determine whether the user might be interested in an aggregated movie and location service.

The ranker filterer 616 ranks services for display to the user based on the anticipated needs of the user. More particularly, the ranker filterer 616 uses extensive historical usage data stored in the user information system 608 is aggregated with contextual information regarding the user, such as the user's geographical location, and business model specific attributes attached to individual services, for example demographic information about the suitability of a service for offer to the user, to rank services. That is, the ranker filterer 616 applies rules and algorithms to the above data to determine which services should be displayed in primary, secondary, and tertiary positions on the screen of a particular user's mobile device. An icon displayed in the primary position represents a service or application that the ranker filterer 616 determines is most likely to be the next service or application that the user will utilize. Icons displayed in the secondary position, which in one embodiment are displayed around the icon displayed in the primary position, represent services and applications that are likely to be utilized, but not as likely as the icon displayed in the primary position. As described above, additional icons available to the user are displayed in the tertiary position.

In addition, the ranker filterer 616 determines whether a service or application should spontaneously appear on the screen and other aspects of the service or application. Further information on service ranking can be found in U.S. Provisional Patent Application No. 60/460,052, entitled "Context Based Main Screen for Mobile Device," filed Apr. 2, 2003, which is incorporated herein by reference, in its entirety for all purposes.

The context module 618 keeps track of different aspects of the users current context. For example, one aspect is the user's network presence, such as whether the user is currently using the network, has just lost a signal, been using the network since 5:00 a.m., is making a call, has their phone ringer off, etc. In addition, the context module 618 keeps track of the users physical location, which can be, for example, the zip code of the user's current location or the user's longitude and latitude. Further, the context module 618 keeps track of the current time translated into the context the user is in, for example, using the user's current time zone, such as Pacific or Hong Kong time. The context module 618 keeps track of the above information for all the subscribers on the system. As such, the carrier network provider can utilize this information to allow subscribers to keep track of where other subscribers such as their friends are located, generally utilizing proper security features facilitated by the identity module 620.

The identity module 620 manages user authentication into the network. When the user switches their mobile device on, the mobile device authenticates with the network. In order for the other functional modules in the system to securely perform the highly personalized functions described thus far, the modules need to know a particular network connection entering the system is authenticated as an appropriate user. For example, the modules need to know that a particular packet of data is coming from a specific user, so that specific user's user information should be utilized to allow that user to interact with the network.

In addition, the identity module 620 performs translations for different types of identity information. Carrier networks utilize various types of identity information. The highest level of identity information is that of an individual user, which includes the user's billing and personalization information. The lowest level of identity information is the MSI serial number on the user's mobile device. When a mobile device connects to a carrier network, the mobile device is assigned an MSI serial number that represents that mobile device on the network. The identity module 620 is capable of translating between specific MSI serial numbers and the corresponding user information, which the MSI serial number represents.

Figure 7A:
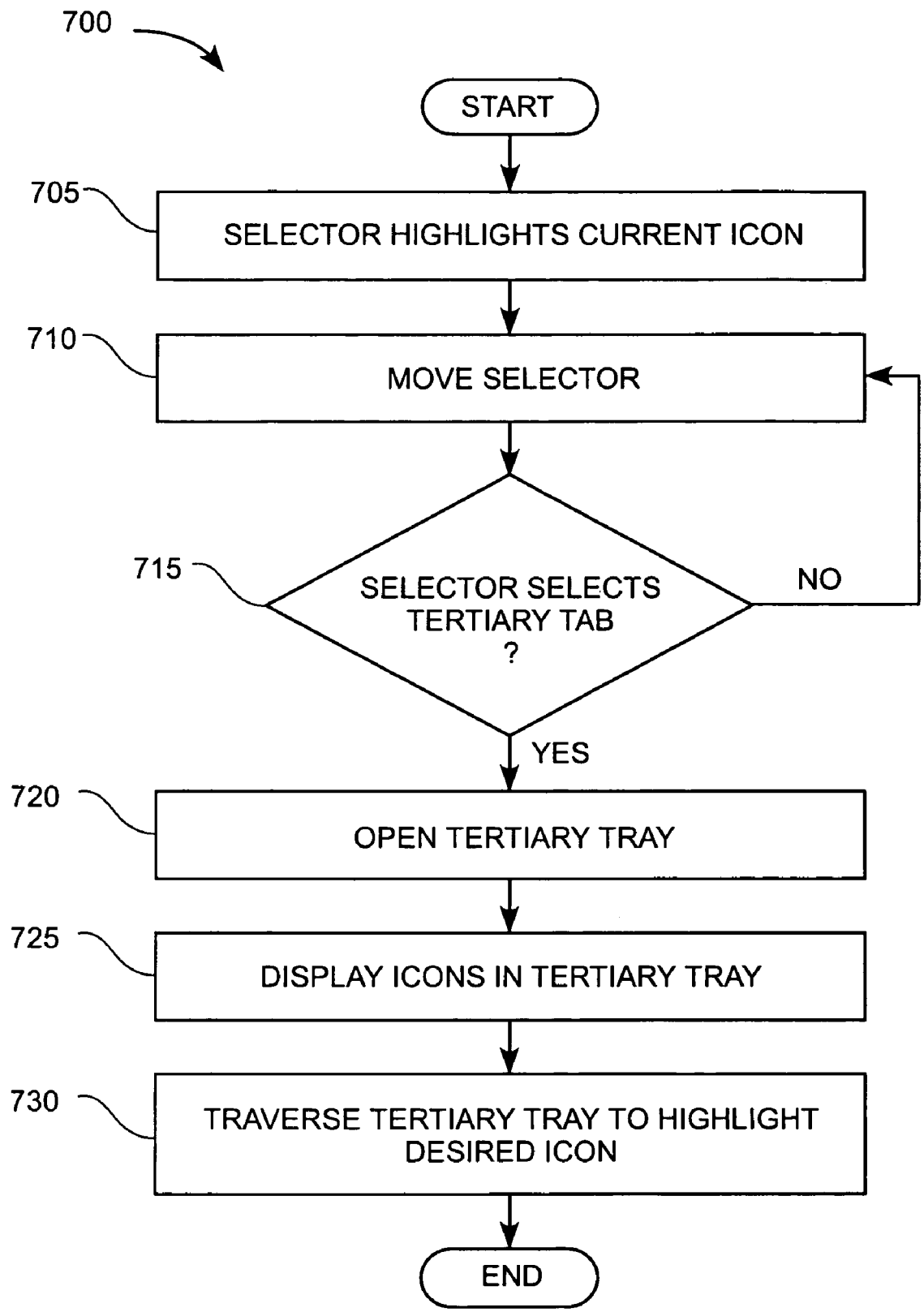
FIG. 7A is a flowchart diagram that illustrates the method operations performed in navigating in a context-based display, in accordance with one embodiment of the present invention.
Figure 7B:
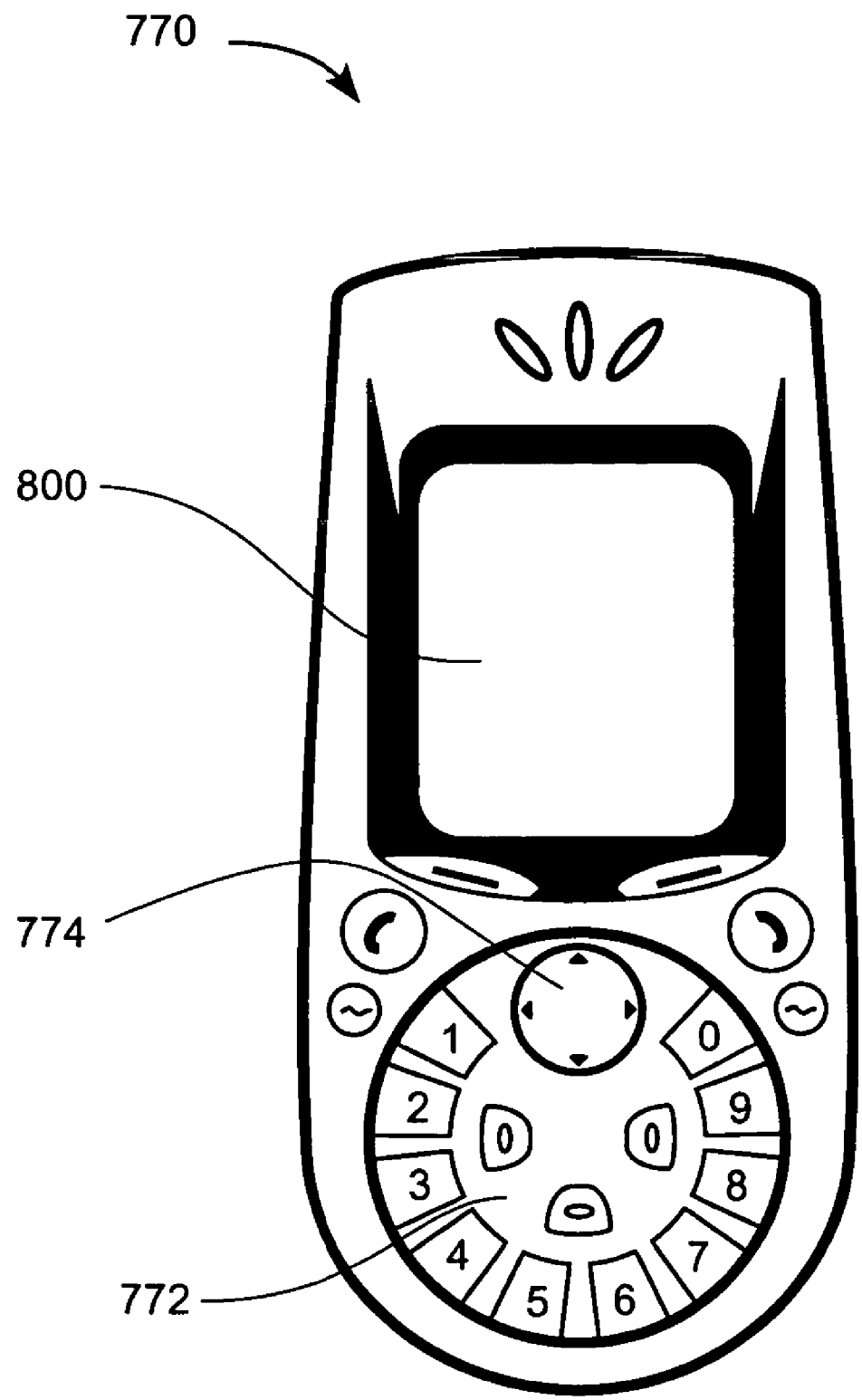
FIG. 7B is an exemplary mobile device, in accordance with one embodiment of the present invention.

FIG. 7A is a flowchart diagram that illustrates the method operations 700 performed in navigating in a context-based display, in accordance with one embodiment of the present invention. FIG. 7B is an exemplary mobile device 770, in accordance with one embodiment of the present invention. FIGS. 8A-8L show a mobile device display 800 in accordance with one or more embodiments of the present invention. FIGS. 7B and 8A-8L are used to further illustrate the described method operations of FIG. 7A below.

Figure 8A:
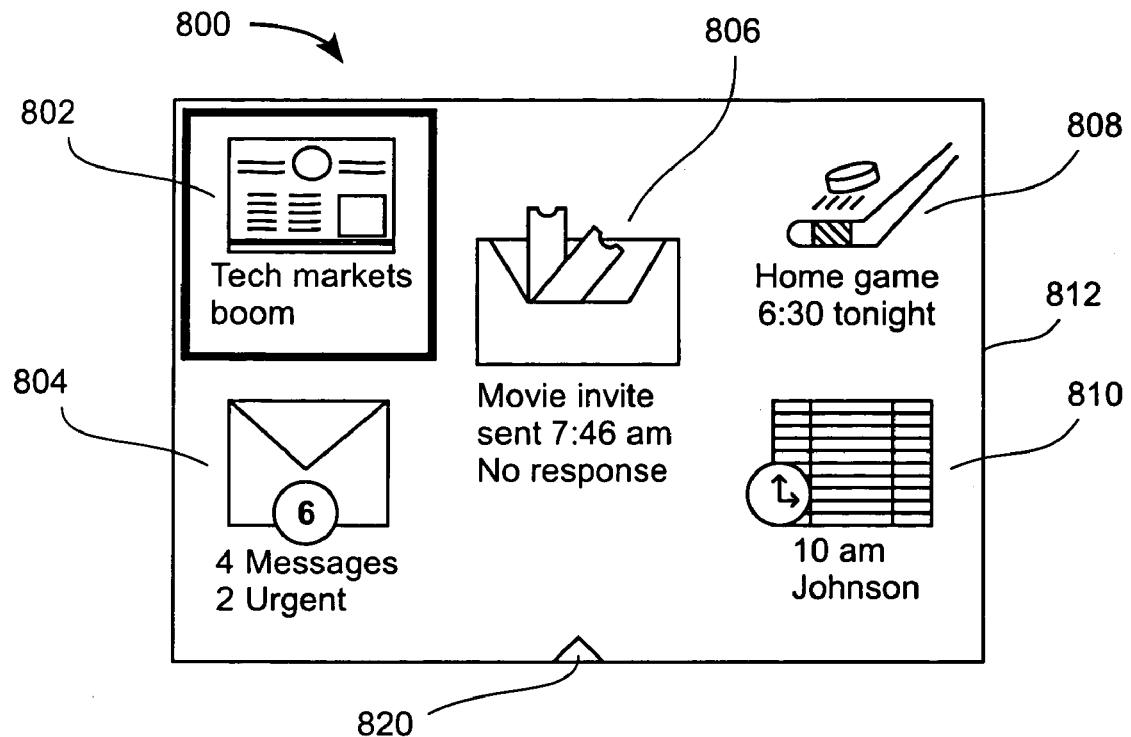
FIGS. 8A-8L show a mobile device display in accordance with one or more embodiments of the present invention.

In operation 705, a selector highlights a current icon. In FIG. 8A, multiple icons 802, 804, 806, 808, 810 are shown in the main portion 812 of the mobile device display 800. Icon 802 is shown highlighted such as by having an illuminated outline around the icon, however, any method of highlighting an icon can be used.

Figure 8B:
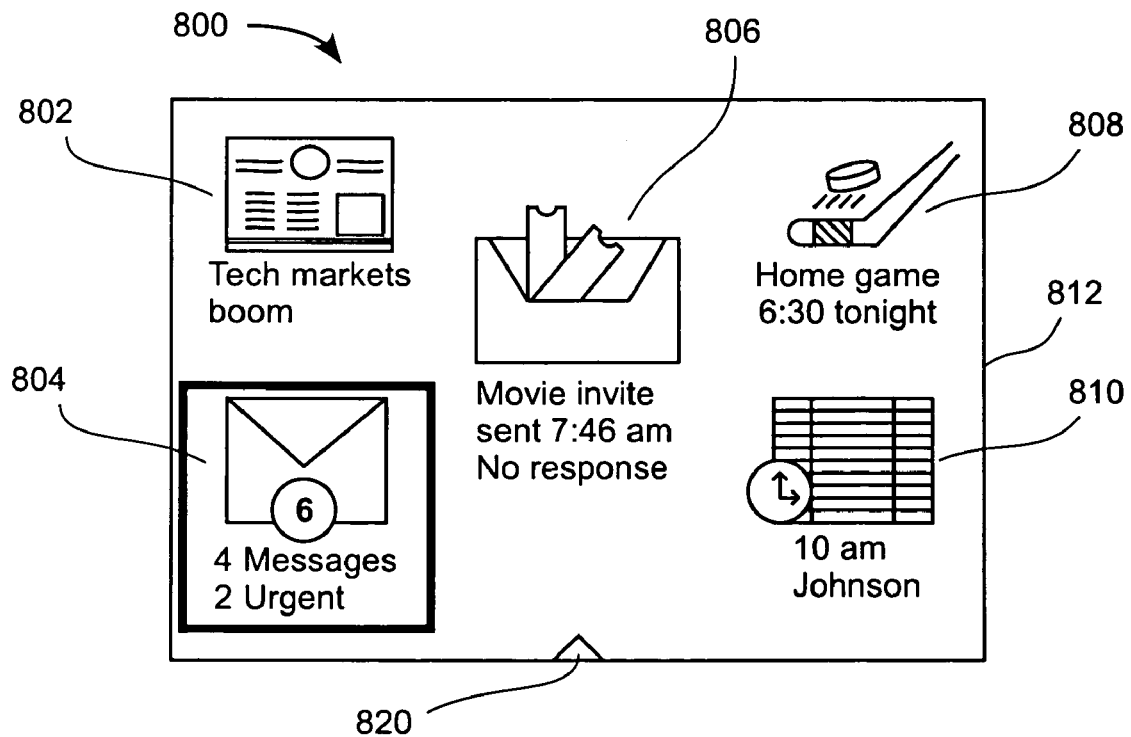
Figure 8C:
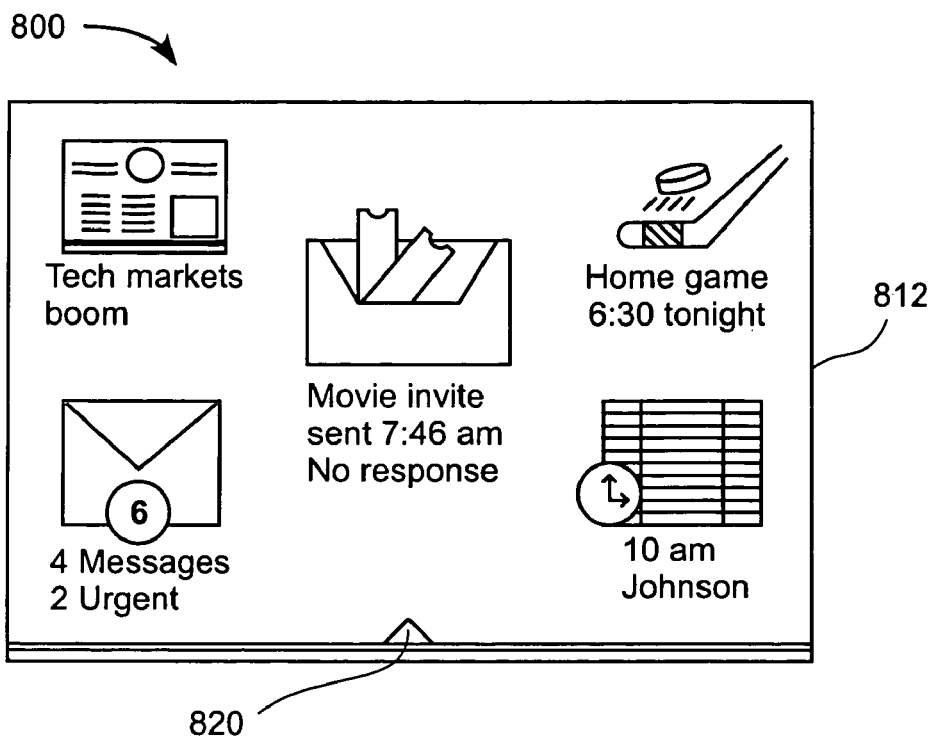
Figure 8D:
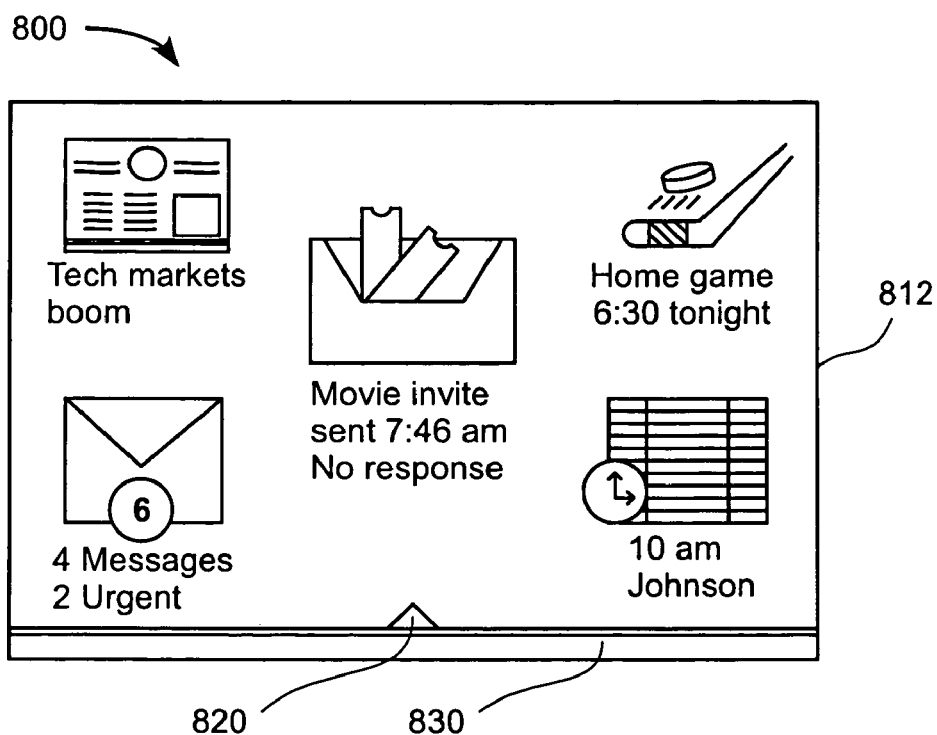
Figure 8E:
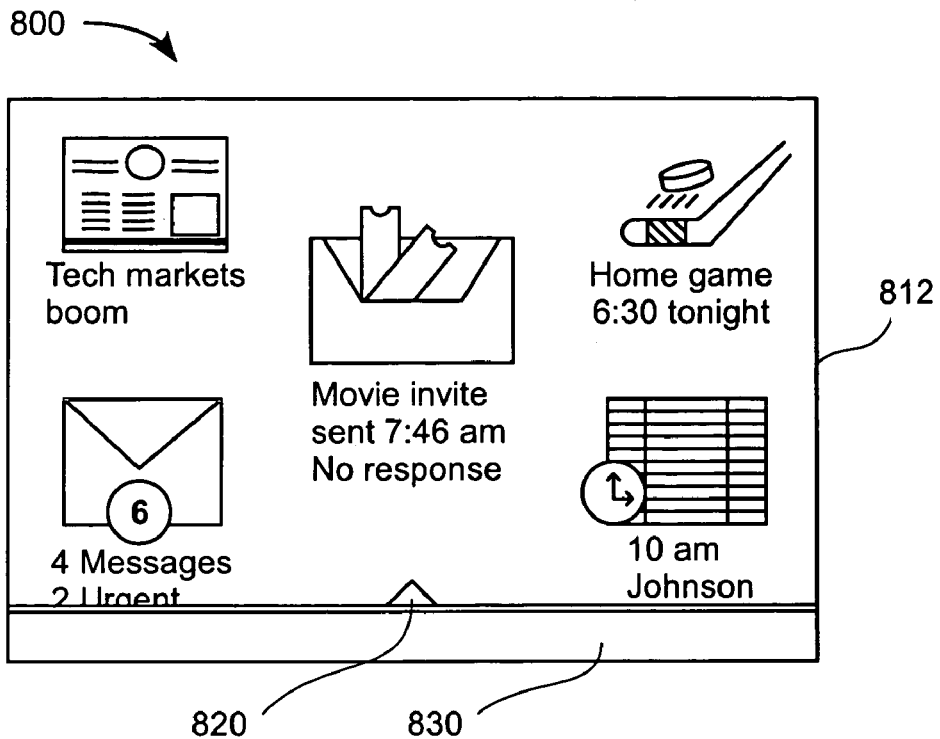

In operation 710, the selector moves to highlight another icon. FIG. 8B shows icon 804 being highlighted in the mobile device display 800. As shown in FIG. 7B, a typical keypad 772 on a mobile device 770 includes one or more navigation type key 774. The navigation type key 774 can include an up and down arrow key(s) and/or a left and right arrow key(s) that can be used to navigate the display 800. The selector can be a down arrow key so as to cause icon 804 to be highlighted instead of icon 802. Similarly, a left arrow key could be used to highlight icon 806. Due to the compact nature of the keypad 772, a limited number of navigation keys can be included.

The selector can be moved across the mobile device display 800, in operations 715 and 720, so as to highlight the tertiary tab 820. Highlighting the tertiary tab 820 opens a dynamically opened or displayed tertiary tray 830. The tertiary tray 830 can be opened instantaneously or alternatively, can be opened in an animated sequence such as shown by the sequence illustrated in FIGS. 8C-8F. The tertiary tray 830 includes multiple icons 832, 834, 836, 838.

Figure 8F:
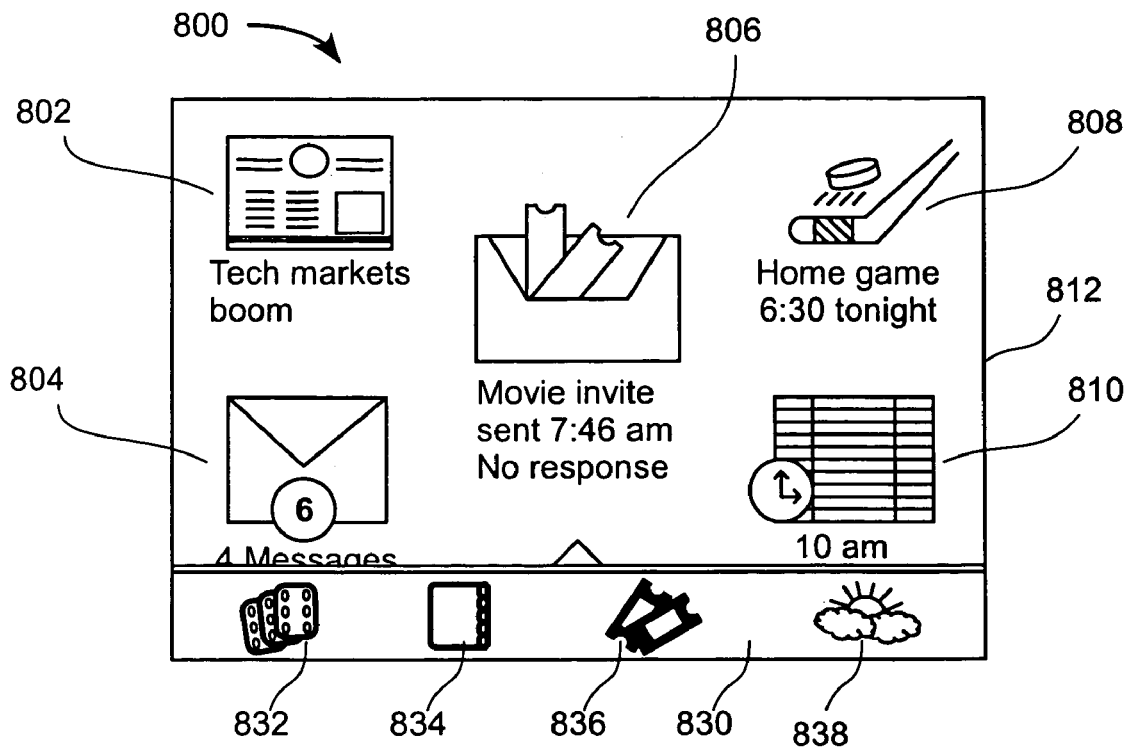

As shown in FIG. 8F, the tertiary tray 830 covers part of the main portion 812 of the display 800. Specifically, part of the icons 804 and 810 and the respective descriptions are covered by the tertiary tray 830. Stated in an alternative way, the tertiary tray is shown "on top of" the main portion 812.

Figure 8G:
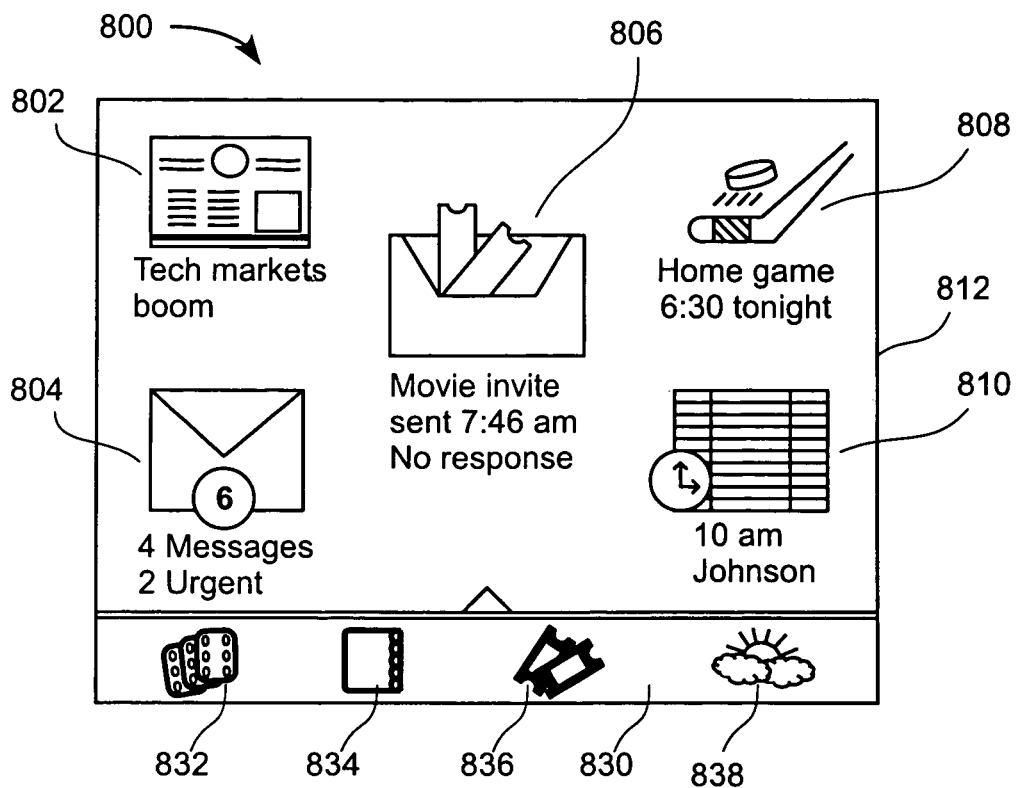

In an alternative embodiment, opening the tertiary tray 830 causes the main portion 812 to be rearranged and/or scaled. Rearranging and/or scaling the main portion 812 allows both the tertiary tray 830 and the icons 802, 804, 806, 808 and 810 to be fully displayed as shown in FIG. 8G. In another alternative embodiment, the tertiary tray 830 can "shift" main portion 812 upward to make room for the tertiary tray in the display. Shifting the main portion 812 upward can cause the main portion to appear to run off of the top edge of the display.

Figure 8H:
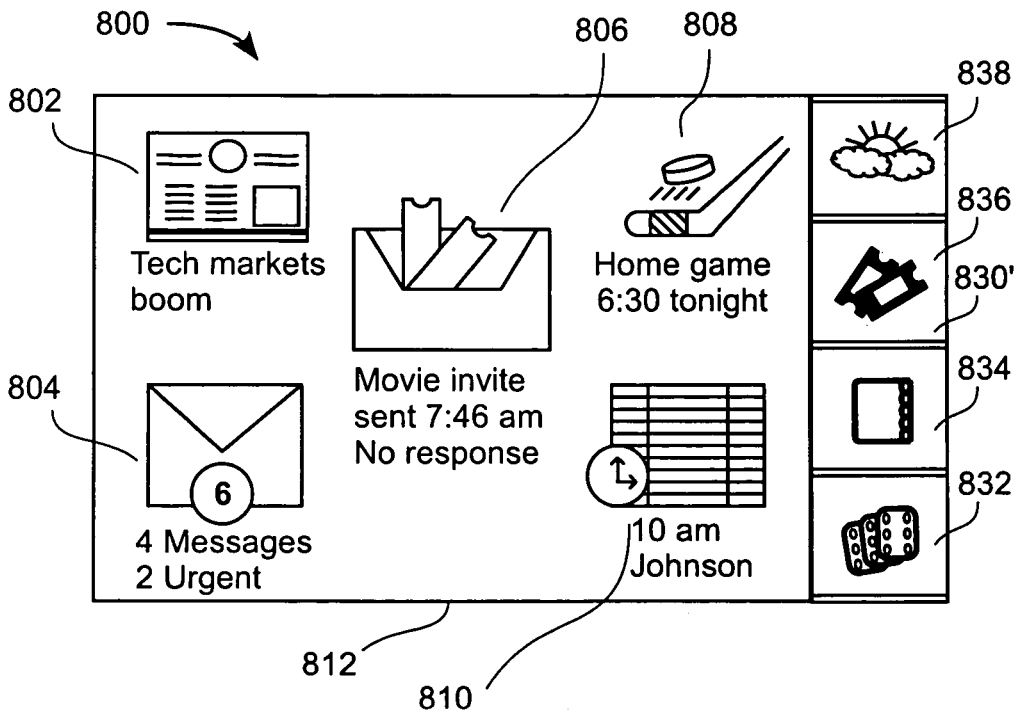

In yet another alternative embodiment shown in FIG. 8H, an alternate tertiary tray 830' is located on one side edge of the display 800 rather than on the bottom edge. The tertiary tray 830' includes icons 832, 834, 836, 838 oriented in a column rather than a row as shown in FIG. 8G above. Similarly, the tertiary tray 830 can shift main portion 812 to one side, similar to shifting the main portion upward as described above.

In still another alternative embodiment, the tertiary tray can be a static tray that is always displayed (e.g., as shown in FIGS. 8F-H, above) rather than a dynamic tray that is opened when the tray is selected as described in FIGS. 8A-8E above. The tertiary tray 830 typically will have a single row or column of icons. However, the icons within the tertiary tray 830 can be arranged in multiple rows or columns of icons.

The tertiary tray 830 can be located on any one or more edges of the display 800. By way of example, a first tertiary tray 830 can be opened (i.e., accessed) by navigating the selector to the bottom edge of the display 800. A second tertiary tray 830' can be opened by navigating the selector to the right edge of the display. Alternatively, the first tertiary tray 830 can be opened by navigating to a tertiary tab 820 that can be located anywhere on the display 800 (e.g., an edge, or other designated portion of the display). The tertiary tab 820 can be any type of mark or identifier and should not be limited to a tab shape as shown in the above referenced figures.

Referring again to FIG. 7A, in operation 730, the tertiary tray 830 can be traversed to highlight a desired icon within the tertiary tray. FIGS. 8I-8L illustrate a sequence of traversing along the tertiary tray 830 such as with a right arrow navigation key 774 as shown in FIG. 7B.

Figure 9:
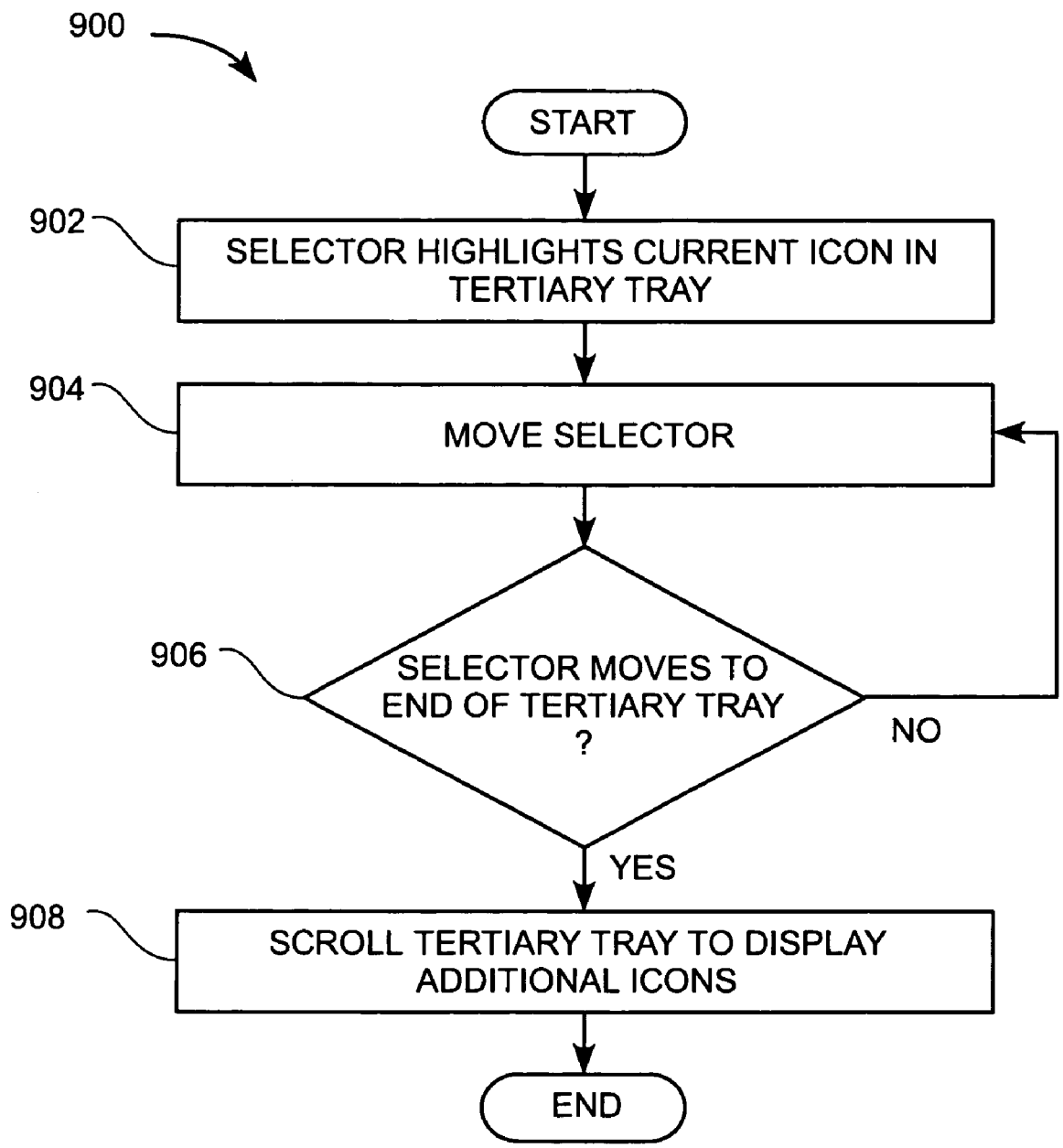
FIG. 9 is a flowchart diagram that illustrates the method operations performed in navigating in a tertiary tray in the context-based display, in accordance with one embodiment of the present invention.

FIG. 9 is a flowchart diagram that illustrates the method operations 900 performed in navigating in a tertiary tray 830 in the context based display 800, in accordance with one embodiment of the present invention. Once the tertiary tray 830 has been opened such as in operation 720 of FIG. 7A above, the selector can be used to navigate within the tertiary tray substantially similarly to navigating the main portion 812 of the display 800.

Figure 8I:
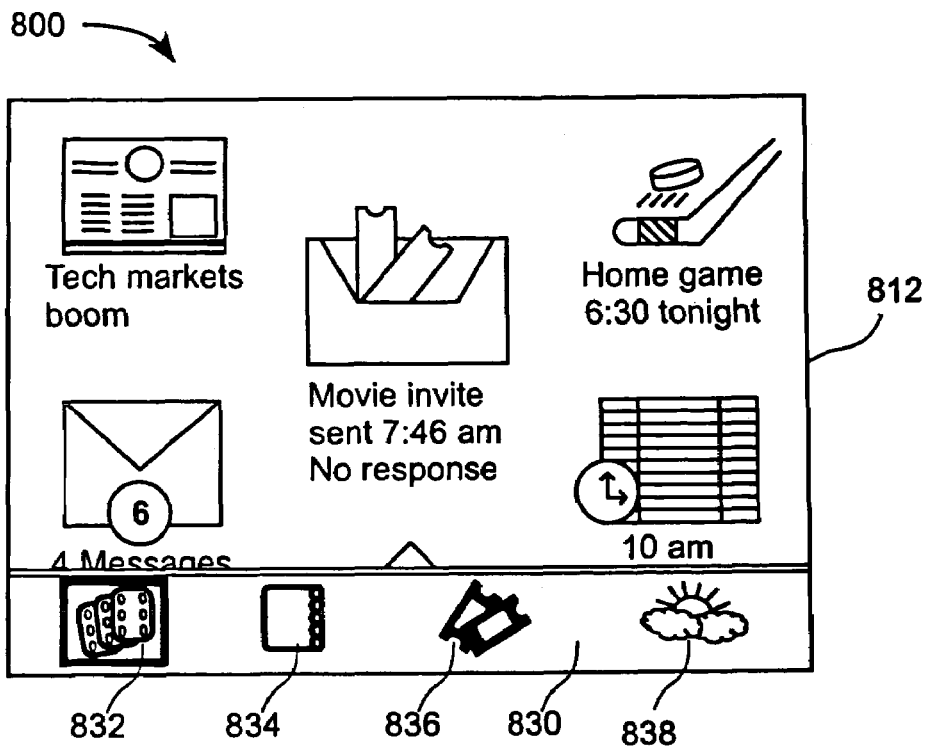
Figure 8J:
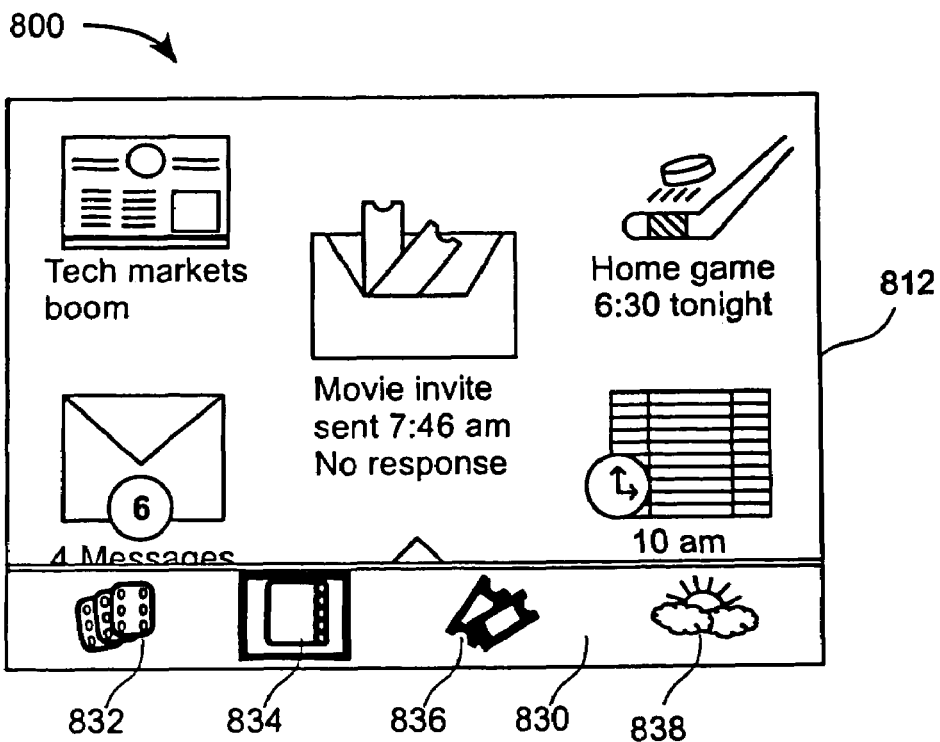
Figure 8K:
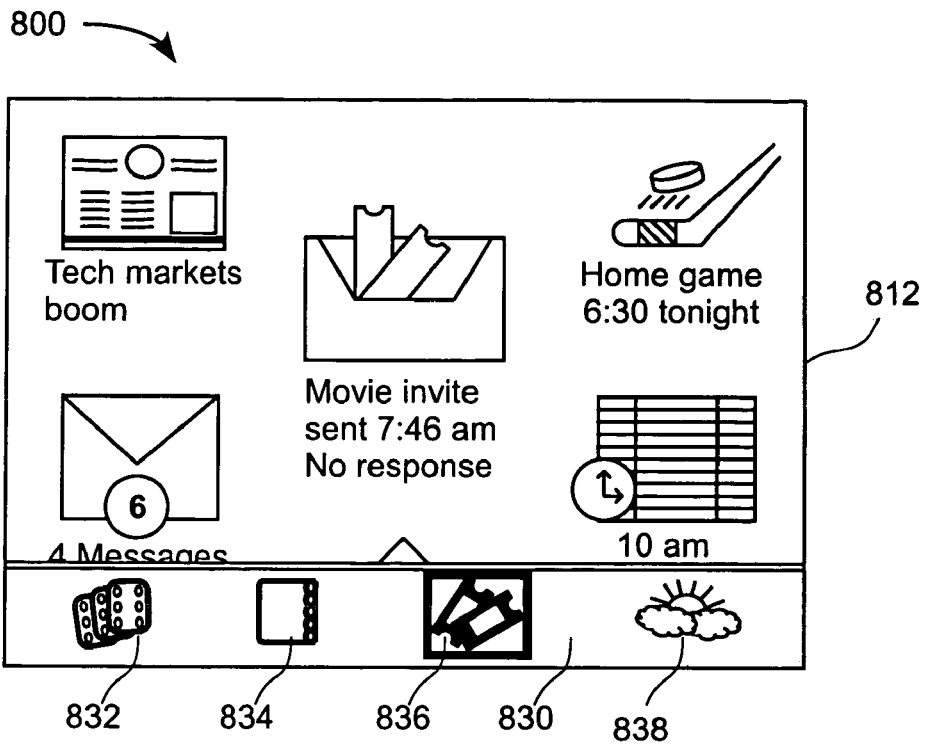
Figure 8L:
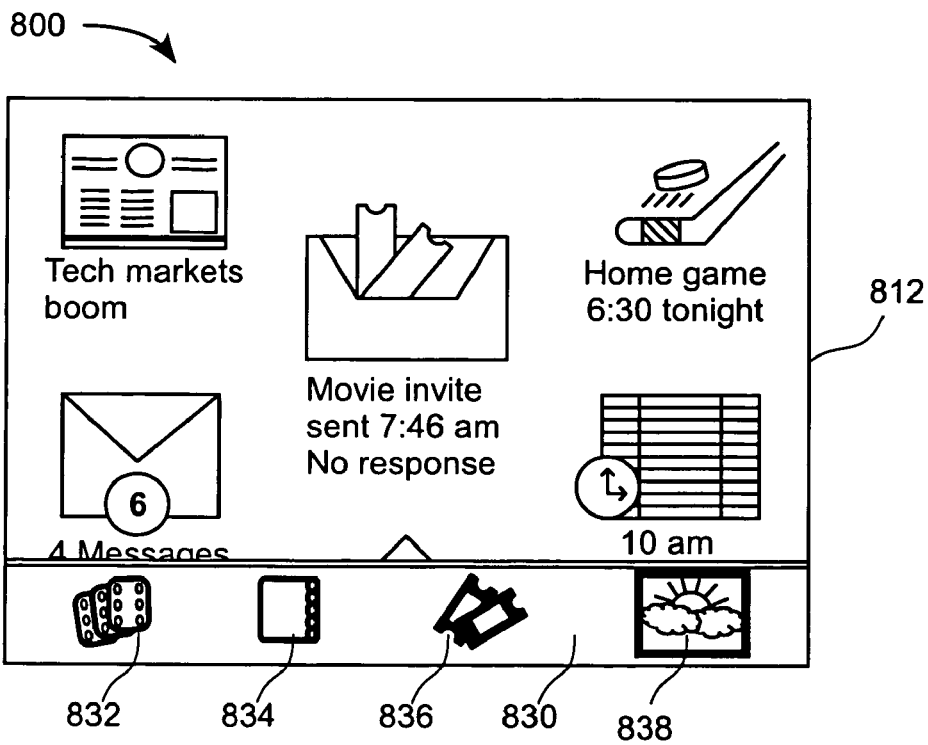

In an operation 902, the selector highlights a current icon in the tertiary tray 830 (e.g., icon 832 as shown in FIG. 8I). The selector can traverse the tertiary tray 830 to subsequent icons 834, 836, 838 and to the end of the tertiary tray as shown in FIGS. 8J-L above in operations 904 and 906.

Figure 10A:
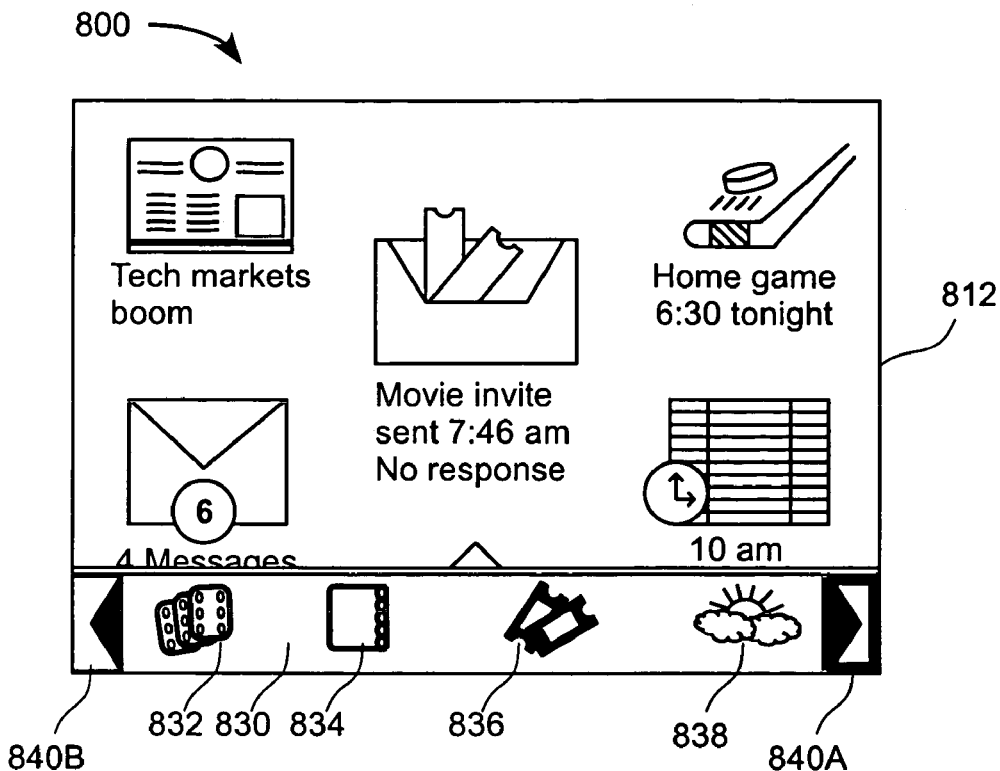
FIG. 10A shows an alternative embodiment of the tertiary tray that includes a scrolling capability (e.g., scroll arrows), in accordance with one embodiment of the present invention.

FIG. 10A shows an alternative embodiment of the tertiary tray 830 that includes a scrolling capability (e.g., scroll arrows 840A, 840B), in accordance with one embodiment of the present invention. The scrolling capability allows the tertiary tray 830 to include more icons than can be displayed in a single width (or height) of the tertiary tray.

In operation 908, selecting the right scrolling arrow 840A can cause the displayed icons 832, 834, 836, 838 to scroll left through the tertiary tray 830. Similarly, selecting the left scrolling arrow 840B can cause the displayed icons 832, 834, 836, 838 to scroll right through the tertiary tray 830.

Figure 10B:
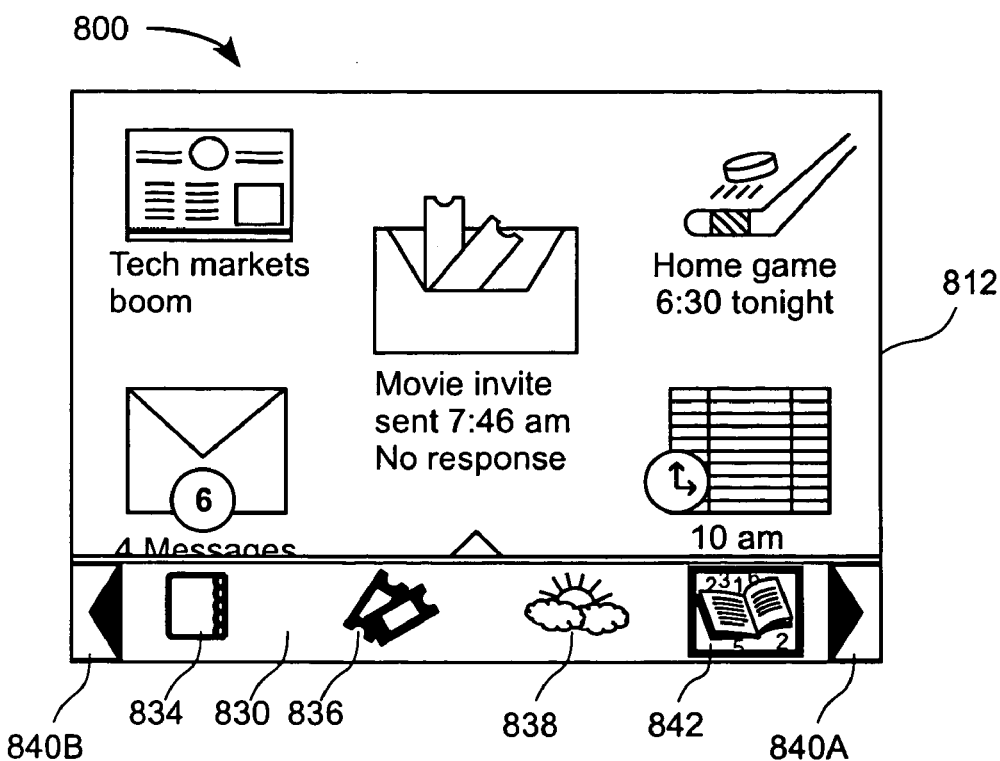
FIG. 10B shows an additional icon displayed in the tertiary tray, as the tertiary tray is scrolled, in accordance with one embodiment of the present invention.

FIG. 10B shows an additional icon 842 displayed in the tertiary tray 830, as the tertiary tray is scrolled, in accordance with one embodiment of the present invention. In this manner additional icons (e.g., icon 842) can be included in the tertiary tray 830. The additional icons can be shown incrementally as the tertiary tray scrolls to reveal them. In one embodiment, the tertiary tray 830 can include substantially all icons that can be shown in the display 800. Selecting an icon in the tertiary tray 830 can cause the selected icon to be displayed in the main portion of the display 800 as will be described in FIGS. 11 and 12A-12B. Alternatively, selecting an icon in the tertiary tray 830 can initiate the service or application represented by the icon.

Figure 11:
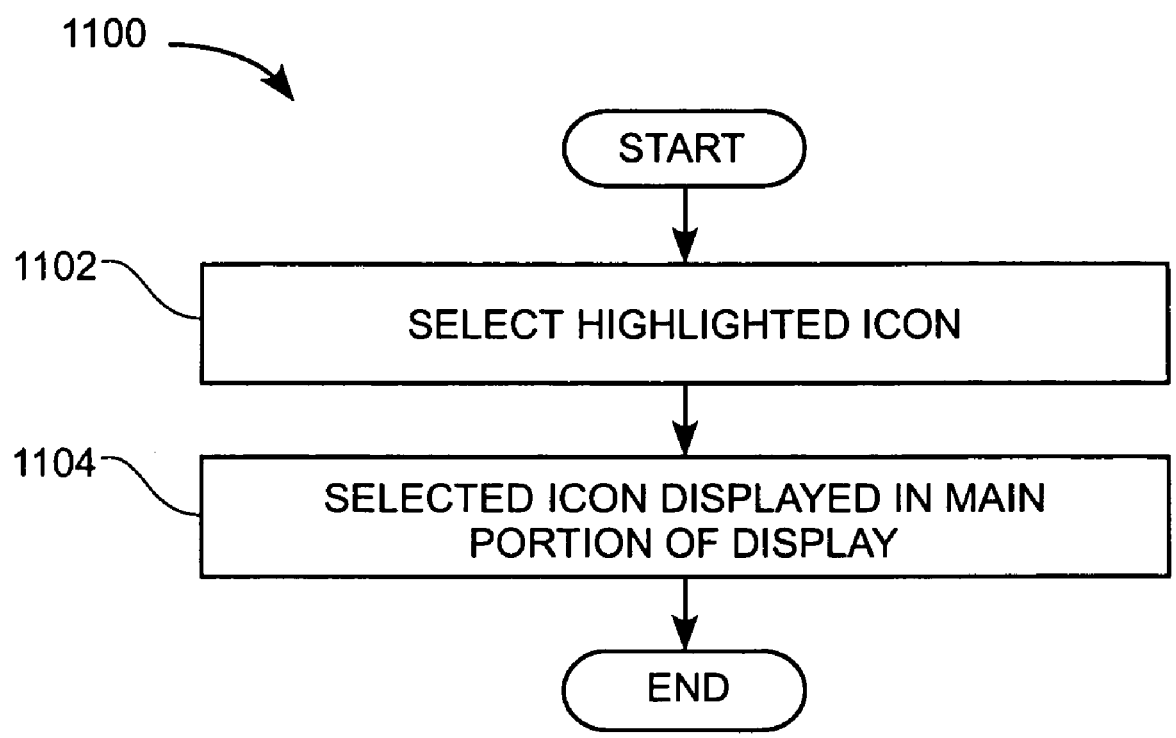
FIG. 11 is a flowchart diagram that illustrates the method operations performed in selecting an icon in the tertiary tray, in accordance with one embodiment of the present invention.

FIG. 11 is a flowchart diagram that illustrates the method operations 1100 performed in selecting an icon 842 in the tertiary tray 830, in accordance with one embodiment of the present invention. In operation 1102 a highlighted icon 842 is selected. In operation 1104, the selected icon 842 is displayed in the main portion 812 of the display screen.

Figure 12A:
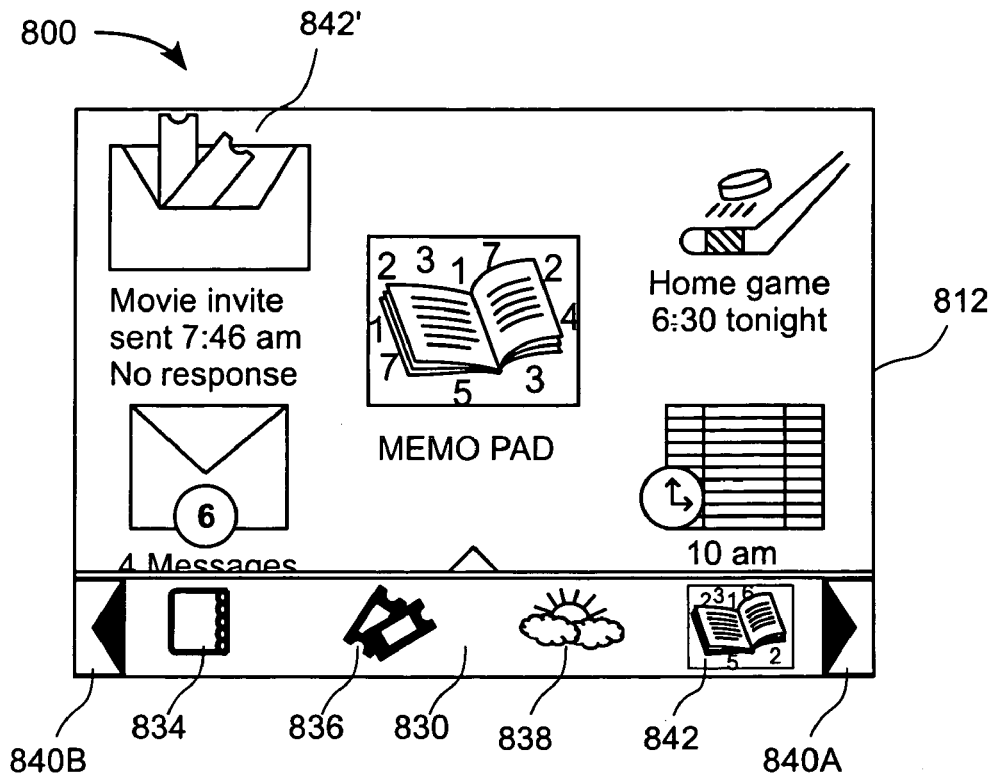
FIGS. 12A-12C show alternative embodiments of selecting an icon in the tertiary tray to be displayed in the main portion of the display.
Figure 12B:
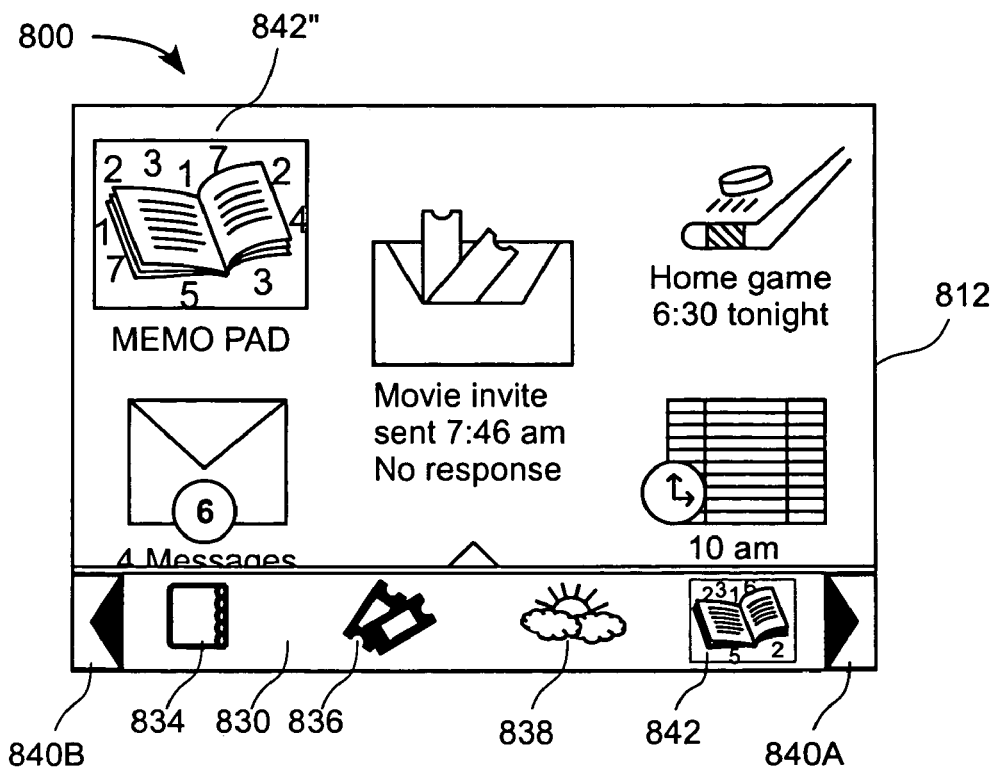
Figure 12C:
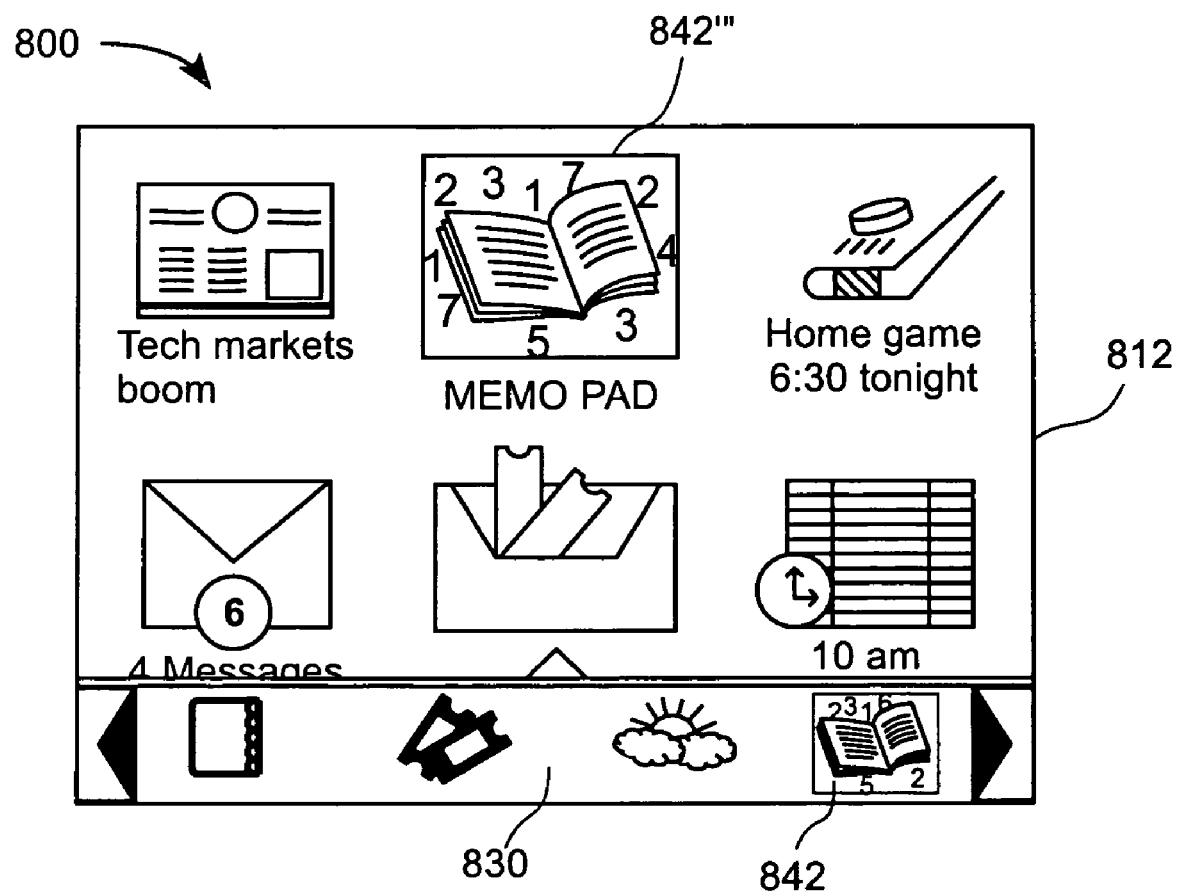

FIGS. 12A-12C show alternative embodiments of selecting an icon 842 in the tertiary tray 830 to be displayed in the main portion 812 of the display. In FIG. 12A selecting the icon 842 in the tertiary tray 830 causes an icon 842' to replace a previously displayed icon (e.g., icon 806 as shown in FIG. 8A above) in the primary position in the main portion 812 of the display 800. In FIG. 12B selecting the icon 842 in the tertiary tray 830 causes the icon 842" to replace a previously displayed icon (e.g., icon 802 as shown in FIG. 8A above) in a secondary position in the main portion 812 of the display 800.

In FIG. 12C selecting the icon 842 in the tertiary tray 830 displays icon 842''' in the main portion 812 of the display 800 but the previously existing icons 802, 804, 806, 808, 810 are rearranged and/or scaled the make room for icon 842'''. While not illustrated in FIGS. 12A-12C, displaying icons 842', 842", 842''' in the main portion 812 of the display 800 can also cause the tertiary tray 830 to close or otherwise to not be displayed such as shown in FIG. 8A above.

Figure 13:
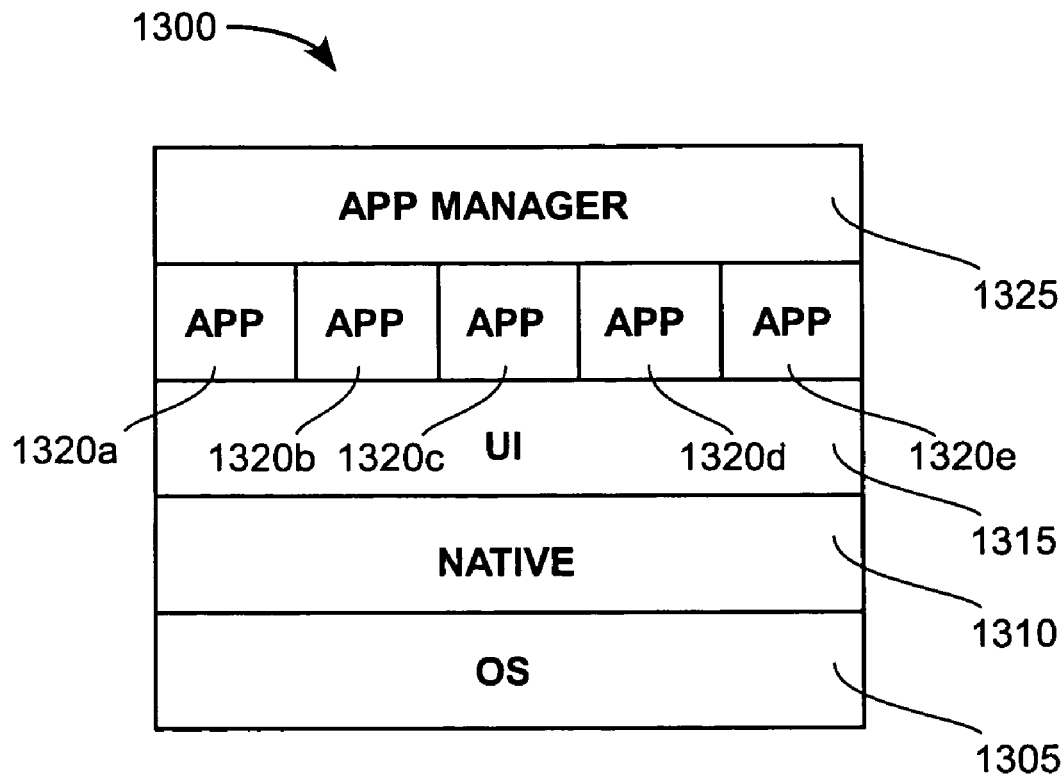
FIG. 13 shows a device stack capable of supporting the user interface display 800, in accordance with one embodiment of the present invention.

FIG. 13 shows a device stack 1300 capable of supporting the user interface display 800, in accordance with one embodiment of the present invention. The operating system (OS) layer 1305 includes a native operating system and native hardware. A native application (native) layer 1310 resides on the OS layer 1305 and performs most native functions (e.g., I/O, networking, record management system). A user interface (UI) layer 1315 resides on the native layer 1310. The user interface layer 1315 provides a user interface to the native functions and the native hardware. Several applications 1320A-E can reside on the UI layer 1315. The applications 1320A-E provide additional functions that may use the underlying layers 1305-1315 such as the interactive mobile device display 800 with multiple dynamic icons 802, 804, 806, 808, 810 such as described above. An application manager layer 1325 manages the various applications 1320A-E such as by allocating resources to the various applications.

Figure 14:
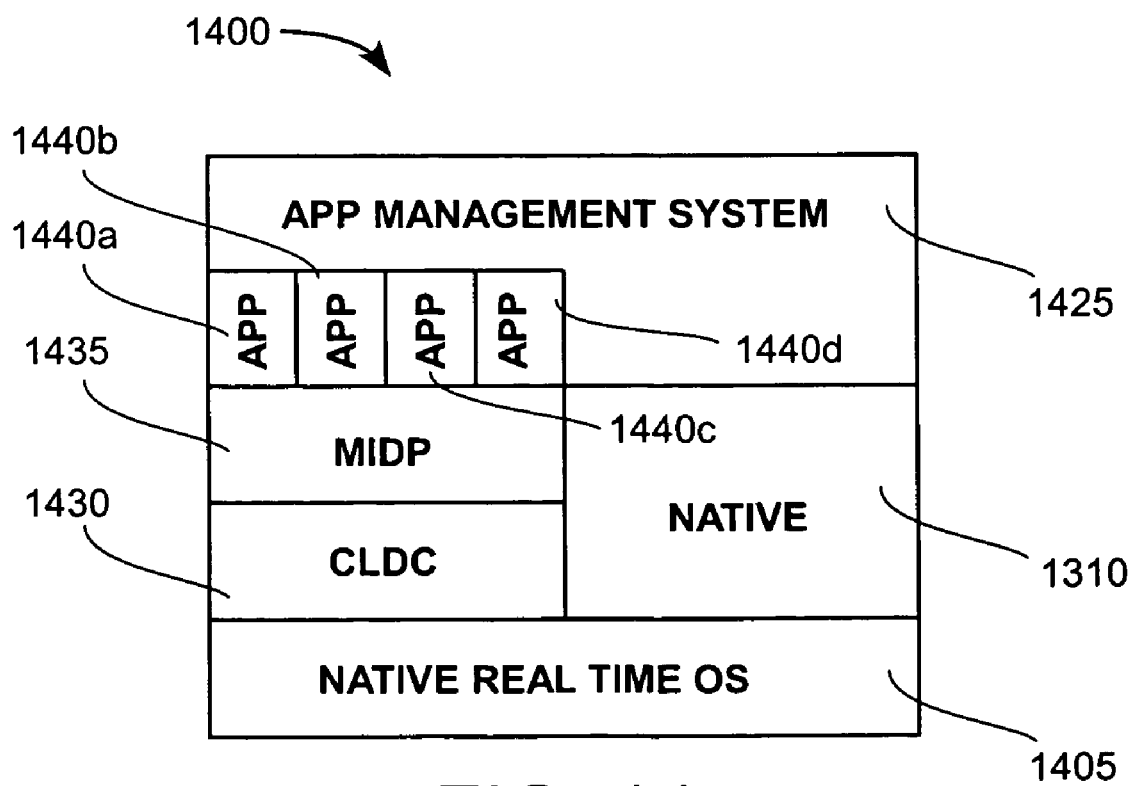
FIG. 14 shows a device stack for a mobile device capable of supporting the user interface display, in accordance with one embodiment of the present invention.

FIG. 14 shows a device stack 1400 for a mobile device capable of supporting the user interface display 800, in accordance with one embodiment of the present invention. The native real time operating system (OS) layer 1405 includes a native operating system and native hardware. A native layer 1310 can also reside on the native real time OS layer 1405. A CLDC layer 1430 can also reside on the native real time OS layer 1405. A MIDP layer 1435 can reside on the CLDC layer 1430. The CLDC layer 1430 and the MIDP layer 1435 are part of the J2ME™ described below. An application management system 1425 can manage both the Java applications 1440A-D and the native applications 1310. While the device stack 1400 includes a Java implementation, it should be understood that embodiments of the present invention may be implemented without Java.

The Java™ 2 Platform, Micro Edition (J2ME™) is the development and deployment environment for enterprise software applications capable of running on a variety of desktop computers, servers, and other computing devices. The J2ME platform includes the Java 2 Software Development Kit, Standard Edition (SDK), and Java Runtime Environment (JRE).

The J2ME platform is a Java platform for consumer and embedded devices such as mobile phones, PDAs, TV set-top boxes, in-vehicle telematics systems, and a broad range of embedded devices. Similar to the enterprise (J2EE™), desktop (J2SE™) and smart card (Java Card™) counterparts, the J2ME platform is a set of standard Java APIs defined through the Java Community Process$^{SM}$ program by expert groups that include leading device manufacturers, software vendors and service providers.

The J2ME platform delivers the power and benefits of Java technology tailored for consumer and embedded devices. The J2ME provides a flexible user interface, robust security model, broad range of built-in network protocols, and support for networked and disconnected applications. J2ME, applications 1440A-D are written for a wide range of devices. The J2ME platform can be deployed on millions of devices (e.g., mobile phones, PDAs, automotive devices, etc.) supported by leading Java technology tools vendors and used by companies worldwide. Briefly stated, J2ME is the preferable platform for consumer and embedded devices.

The SDK provides software programmers with the speed, security and functionality to create cross-platform, mission critical applications. The JRE provides the execution environment needed to run Java platform-based applets and applications.

The J2ME architecture defines configurations, profiles and optional packages as elements for building complete Java runtime environments that meet the requirements for a broad range of devices and target markets. Each combination is optimized for the memory, processing power, and I/O capabilities of a related category of devices. The result is a common Java platform that fully leverages each type of device to deliver a rich user experience.

Configurations are composed of a virtual machine and a minimal set of class libraries. The configurations provide the base functionality for a particular range of devices that share similar characteristics (e.g., network connectivity, memory footprint, etc.). Currently, there are two J2ME configurations: the Connected Limited Device Configuration (CLDC) 1430, and the Connected Device Configuration (CDC).

The CLDC 1430 is the smaller of the two configurations, and by way of example, is designed for devices with intermittent network connections, slow processors, and limited memory (e.g., mobile phones, two-way pagers, PDAs, etc.). By way of example, the devices may have either 16- or 32-bit CPUs, and a minimum of 128 KB to 512 KB of memory available for the Java platform implementation and the associated applications.

The CDC is designed for devices having more memory, faster processors, and greater network bandwidth (e.g., TV set-top boxes, residential gateways, in-vehicle telematics systems, high-end PDAs, etc.). CDC includes a full-featured Java virtual machine, and a much larger subset of the J2SE platform than CLDC. As a result, most CDC-targeted devices have 32-bit CPUs and a minimum of 2 MB of memory available for the Java platform and associated applications.

In order to provide a complete runtime environment targeted at specific device categories, configurations can be combined with a set of higher level APIs or profiles that further define the application life cycle model, the user interface, and access to device specific properties.

The Mobile Information Device Profile (MIDP) 1435 is designed for mobile phones and entry-level PDAs. Broadly speaking, MIDP 1435 can be used on any computing device that needs to take advantage of MIDP's functions. MIDP 1435 is a set of Java APIs which, together with CLDC 1430, provides a complete J2ME application runtime environment targeted at mobile information devices, such as mobile phones and entry level PDAs. In this manner, MIDP 1435 offers the core application functionality required by mobile applications (e.g., the user interface, network connectivity, local data storage, and application management, etc.). Combined with CLDC 1430, MIDP 1435 provides a substantially complete Java runtime environment that leverages the capabilities of handheld devices and minimizes both memory and power consumption.

Currently, CLDC 1430, combined with the MIDP 1435 is the Java runtime environment for mobile information devices (MIDs) (e.g., phones, entry level PDAs, etc.). MIDP 1435 provides the core application functionality required by mobile applications 1440A-D (e.g., the user interface, network connectivity, local data storage, and application life-cycle management packaged as a standardized Java runtime environment and set of Java APIs, etc.).

The CLDC 1430 can include profiles that are layered so that profiles can be added as needed to provide application functionality for different types of devices. The Foundation Profile (FP) is the lowest level profile for CLDC and provides a network-capable implementation of CLDC that can be used for deeply embedded implementations without a user interface. FP can also be combined with Personal Basis Profile and Personal Profile for devices that require a graphical user interface (GUI).

The Personal Profile (PP) is the CLDC profile aimed at devices requiring full GUI or Internet applet support (e.g., high-end PDAs, communicator-type devices, game consoles, etc.). PP includes the full Java Abstract Window Toolkit (AWT) libraries and offers Web fidelity capable of easily running Web-based applets designed for use in a desktop environment. PP replaces PersonalJava™ technology and provides PersonalJava applications a clear migration path to the J2ME platform.

The Personal Basis Profile (PBP), is a subset of PP. PBP provides an application environment for network connected devices that support a basic level of graphical presentation or require the use of specialized graphical toolkits for specific applications. Devices (e.g., TV set-top boxes, in-vehicle telematics systems, information kiosks, etc.) Both PP and PBP are layered on top of CLDC and FP.

The J2ME platform can be further extended by combining various optional packages with CLDC, CDC, and their corresponding profiles. In this manner, specific market requirements can be addressed. Furthermore, optional packages can offer standard APIs for using both existing and emerging technologies (e.g., Bluetooth, Web services, wireless messaging, multimedia, database connectivity, etc.). As optional packages are modular, device manufacturers can include the optional packages, as needed, to fully leverage the features of each device.

As used herein in connection with the description of the invention, the term "about" means +/−10%. By way of example, the phrase "about 8:00 am" indicates a range of time between 7:00 am and 9:00 am and an amount of about 250 indicates a range of between 225 and 275. Although the present invention implements Java programming language in at least some embodiments, other programming languages may also be used to implement the embodiments of the present invention (e.g., C, $C_{++}$, any object oriented programming language, etc.).

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data that can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIGS. 7A, 9 and 11 are not required to be performed in the order illustrated, and that all the processing represented by the operations may not be necessary to practice the invention. Further, the processes described in FIGS. 7A, 9 and 11 can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of navigating a mobile device display comprising:
    highlighting a first icon of a first plurality of icons displayed in a main portion of the mobile device display;
    traversing the main portion to a tertiary tab, wherein traversing the main portion to the tertiary tab includes opening the tertiary tray by highlighting the tertiary tab, wherein opening the tertiary tray includes displaying the tertiary tray in the mobile device display and wherein opening the tertiary tray includes rearranging only a portion of the main portion of the mobile device display such that all of the first plurality of icons remain visible in the main portion of the mobile device display, the tertiary tray including a second icon; and
    highlighting the second icon of a second plurality of icons displayed in the tertiary tray, wherein a single navigation key is used to traverse the main portion and to highlight the second icon, wherein the tertiary tray is adjacent to an edge of the mobile device display wherein displaying the second icon in the main portion of the mobile device display includes removing the first icon from the main portion of the mobile device display.

2. The method of claim 1, wherein the tertiary tray includes at least one scroll button and wherein selecting the scroll button causes a third icon of the second plurality of icons to be displayed in the tertiary tray.

3. The method of claim 2, wherein selecting the scroll button includes shifting the second icon.

4. The method of claim 3, wherein shifting the second icon includes not displaying the second icon in the tertiary tray.

5. The method of claim 1, wherein opening a tertiary tray includes covering at least part of the main portion of the mobile device display.

6. The method of claim 5, wherein covering at least part of the main portion of the mobile device display includes covering at least part of the first icon.

7. The method of claim 1, wherein opening a tertiary tray includes scaling at least part of the main portion of the mobile device display.

8. The method of claim 1, wherein opening the tertiary tray includes shifting at least part of the main portion of the mobile device display.

9. The method of claim 1, further comprising selecting the second icon.

10. The method of claim 9, wherein selecting the second icon initiates an application corresponding to the second icon.

11. The method of claim 9, wherein selecting the second icon closes the tertiary tray.

12. The method of claim 9, wherein selecting the second icon causes the second icon to be displayed in the main portion of the mobile device display.

13. The method of claim 1, wherein the tertiary tray is adjacent to a horizontal edge of the mobile device display.

14. The method of claim 1, wherein the tertiary tray is adjacent to a vertical edge of the mobile device display.

15. A method of navigating a mobile device display comprising:
   highlighting a first icon of a first plurality of icons displayed in a main portion of the mobile device display;
   traversing the main portion to a vertical tertiary tab, wherein traversing the main portion to the tertiary tab includes opening the tertiary tray by highlighting the tertiary tab, wherein opening the tertiary tray includes displaying the tertiary tray in the mobile device display and wherein opening the tertiary tray includes rearranging only a portion of the main of the mobile device display such that all of the first plurality of icons remain visible in the main portion of the mobile device display, the tertiary tray including a second icon of a second plurality of icons displayed in the tertiary tray;
   highlighting the second icon, wherein a single navigation key is used to traverse the main portion and to highlight the second icon, wherein the tertiary tray is adjacent to an edge of the mobile device display; and
   selecting the second icon, wherein selecting the second icon initiates at least one of a corresponding application and a corresponding service wherein displaying the second icon in the main portion of the mobile device display includes moving the first icon in the main portion of the mobile device display.

16. The method of claim 15, wherein the tertiary tray is adjacent to at least one of a horizontal edge of the mobile device display or a vertical edge of the mobile device display.

* * * * *